(12) United States Patent
Hirayama

(10) Patent No.: US 8,354,839 B2
(45) Date of Patent: Jan. 15, 2013

(54) PORTABLE TERMINAL DEVICE AND POSITION DETECTION METHOD USED THEREIN

(75) Inventor: Ryusuke Hirayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/822,192

(22) Filed: Jul. 3, 2007

(65) Prior Publication Data

US 2008/0036452 A1    Feb. 14, 2008

(30) Foreign Application Priority Data

Aug. 8, 2006   (JP) .................................. 2006-216031
Sep. 27, 2006  (JP) .................................. 2006-263121

(51) Int. Cl.
*G01B 7/30* (2006.01)
(52) U.S. Cl. .............................. 324/207.25; 324/207.21
(58) Field of Classification Search ............. 324/207.25, 324/207.21; 455/575.1, 575.3; 33/1 PT
See application file for complete search history.

(56) References Cited

U.S. PATENT DOCUMENTS

| | | | | |
|---|---|---|---|---|
| 5,471,653 A | * | 11/1995 | Nagai | 455/575.1 |
| 7,174,195 B2 | * | 2/2007 | Nagamine | 455/575.1 |
| 7,271,584 B2 | * | 9/2007 | Chilcote et al. | 324/207.25 |
| 7,499,737 B2 | * | 3/2009 | Mizuta et al. | 455/575.3 |
| 2003/0223576 A1 | * | 12/2003 | Totani | 379/433.04 |
| 2004/0019439 A1 | | 1/2004 | El-Ibiary | |
| 2005/0049017 A1 | * | 3/2005 | Yoda | 455/575.1 |
| 2005/0124392 A1 | * | 6/2005 | Jeong | 455/575.1 |

FOREIGN PATENT DOCUMENTS

| | | |
|---|---|---|
| JP | 54-148577 A | 11/1979 |
| JP | 2003-319043 A | 11/2003 |
| JP | 2005-176372 A | 6/2005 |
| JP | 2005-303688 A | 10/2005 |
| JP | 2006-191438 A | 7/2006 |
| KR | 2004-85745 A | 10/2004 |

OTHER PUBLICATIONS

Korean Office Action dated Mar. 29, 2008 (mailing date), issued in corresponding Korean Patent Application No. 10-2007-0075864.
Office Action issued Oct. 5, 2010 in corresponding Japanese patent application No. 2006-263121. (Partial Translation).

* cited by examiner

*Primary Examiner* — Bot Ledynh
(74) *Attorney, Agent, or Firm* — Westerman, Hattori, Daniels & Adrian, LLP

(57) ABSTRACT

A portable terminal device is disclosed that includes a movable part having a display part; an arm part supporting the movable part so that the movable part is rotatable at least ±90° with reference to a rotation center position around a rotation center; and a position detection part detecting the position of the movable part relative to the arm part. The position detection part includes magnets, magnetic sensors detecting the magnetic fields thereof, and a calculation part determining the position of the movable part based on sensor outputs. The magnets are provided in one of the arm part and the movable part so as to be 90° apart from each other around the rotation center. The magnetic sensors are provided in the other one of the arm part and the movable part so as to oppose the corresponding magnets when the movable part is positioned at the rotation center position.

8 Claims, 32 Drawing Sheets

FIG.3

| FIRST MAGNETIC SENSOR | SECOND MAGNETIC SENSOR | DETECTION STATE |
|---|---|---|
| L | L | A |
| H | L | C |
| L | H | B |
| H | H | A—B<br>A—C |

FIG.7

| FIRST MAGNETIC SENSOR | SECOND MAGNETIC SENSOR | DETECTION STATE |
|---|---|---|
| L | L | A |
| H | L | C |
| L | H | B |
| H | H | A−B<br>A−C |

FIG.18

A : 0° ROTATED STATE

B : +90° ROTATED STATE

C : -90° ROTATED STATE

| FIRST MAGNETIC SENSOR | SECOND MAGNETIC SENSOR | STATE |
|---|---|---|
| L | L | A |
| L | H | B |
| H | L | C |

FIG.22

A : 0° ROTATED STATE

B : +90° ROTATED STATE

C : -90° ROTATED STATE

| FIRST MAGNETIC SENSOR | SECOND MAGNETIC SENSOR | STATE |
|---|---|---|
| L | H | A |
| H | L | B |
| H | H | C |

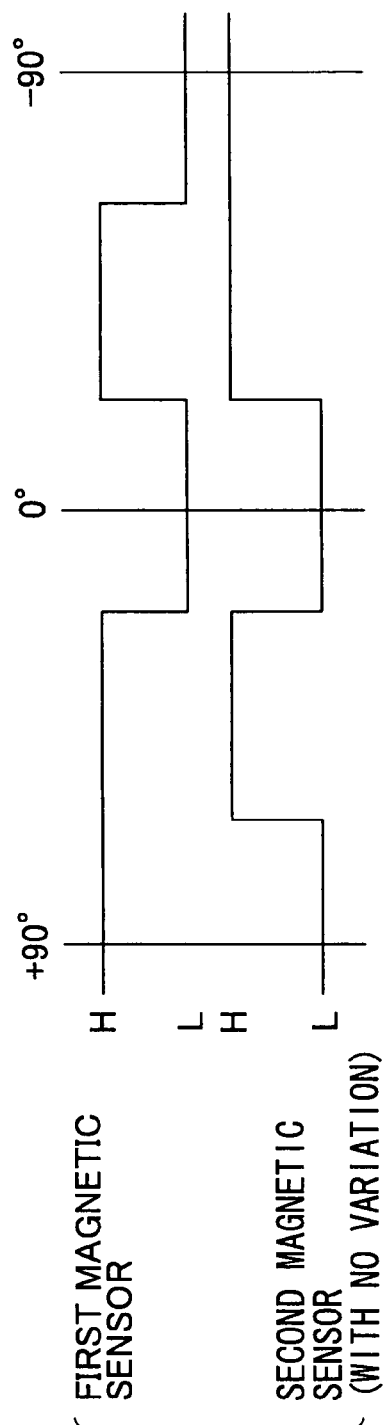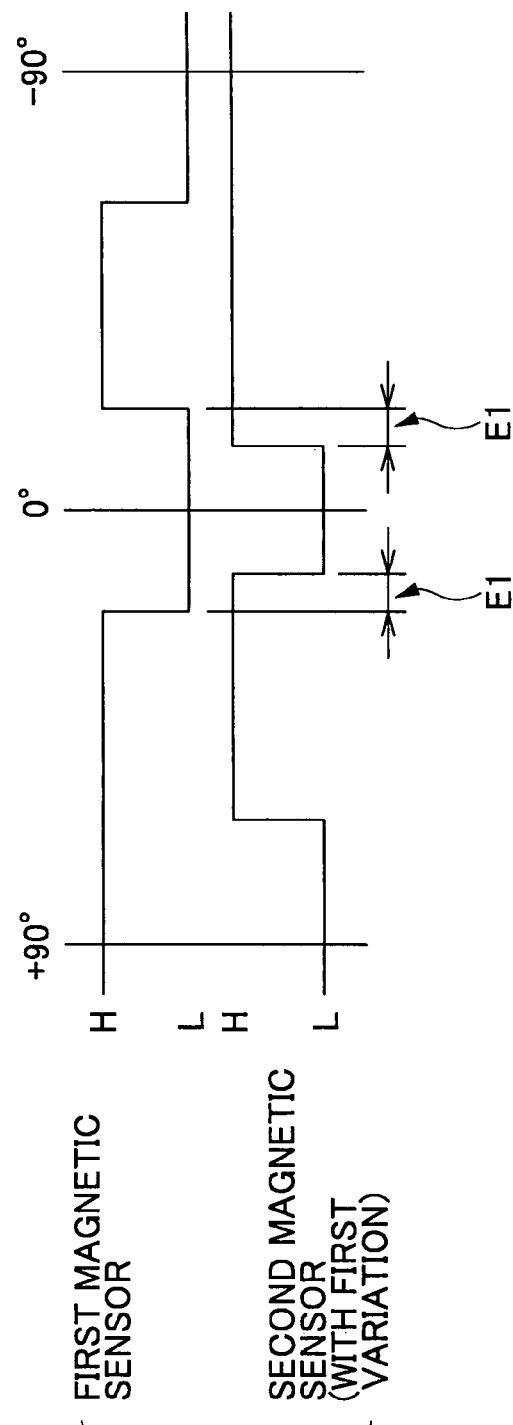

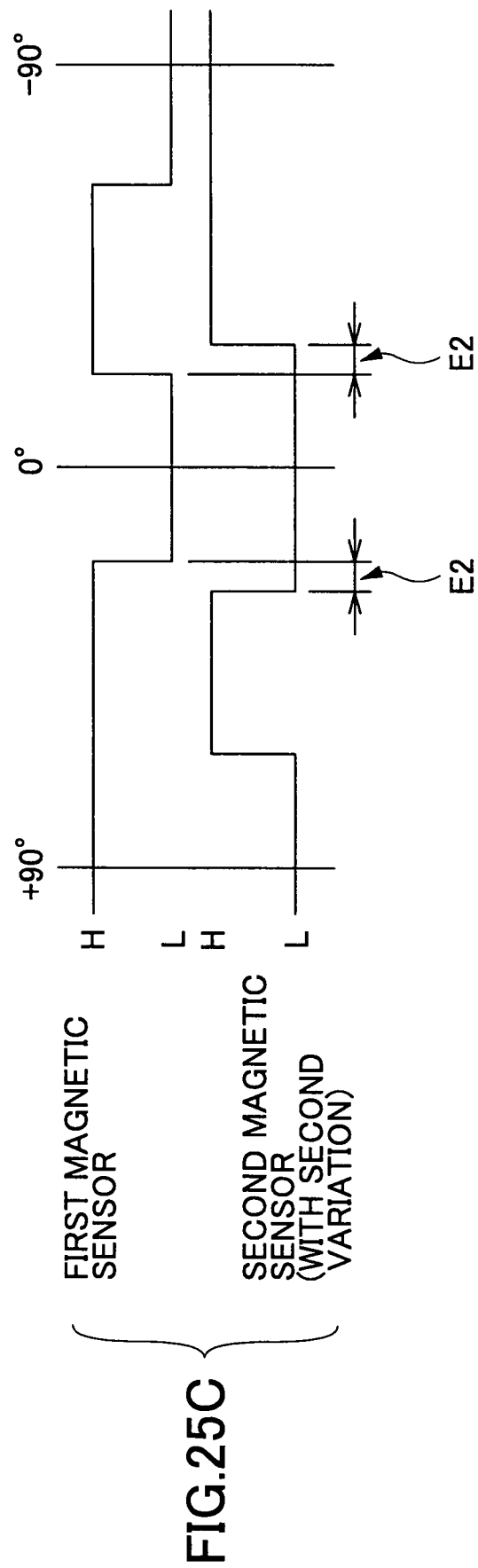

PORTABLE TERMINAL DEVICE AND POSITION DETECTION METHOD USED THEREIN

BACKGROUND OF THE INVENTION

1. Field of the Invention

The present invention relates generally to portable terminal devices and position detection methods used therein, and more particularly to a portable terminal device having a rotatable liquid crystal display part and a position detection method used therein.

2. Description of the Related Art

In recent years, portable terminal devices typified by cellular phones have been more and more diversified and provided with more and more functions with development of data communications. Further, with a dramatic increase in the amount of information processable in portable terminal devices, their display parts (liquid crystal display units) have come to have larger screens. Moreover, there have been provided cellular phones capable of receiving one-segment (one-segment partial reception service) broadcasting, and it is also desired that such cellular phones displaying television pictures have liquid crystal display units with larger screens.

With respect to portable terminal devices typified by conventional cellular phones, it is important to reduce size and weight in terms of portability. Further, in terms of operability, common portable terminal devices have vertically elongated shapes so as to be easy to hold, so that their display parts are commonly disposed in portrait positions in accordance with their shapes. However, in the case of displaying letters or characters on such a display part disposed in a portrait position, the number of letters or characters displayed per line is limited, which makes sentences hard to read. Further, in the case of displaying a television picture on the vertically elongated display part, the screen is reduced in size or a large part of the television picture is not displayed because the television picture is horizontally elongated, thus resulting in inefficiency.

Therefore, there have been provided portable terminal devices in which the display part is rotatable relative to the main body of the device. (for example, see Patent Documents 1 and 2 listed below.) In the case of carrying such portable terminal devices, the display part is in a portrait position so as to maintain portability. On the other hand, at the time of using the display part, for example, displaying a television picture, the display part is rotated to be in a landscape position, thereby improving display characteristics.

In such portable terminal devices where the display part is rotatable relative to the main body of the device, it is necessary to switch the display in accordance with the state (position) of the display part. That is, when the display part is in a portrait position, it is necessary to display a screen with a correct orientation for this position. When the display part is rotated from this position, the screen should also be displayed with a correct orientation for a position to which the display part is rotated.

Therefore, such portable terminal devices where the display part is rotatable relative to the main body of the device have a position detection part configured to detect the position (orientation) of the display unit. The image display part that displays an image on the display part is configured to switch the display so that the image is displayed in accordance with the position of the display part detected by this position detection part.

[Patent Document 1] Japanese Laid-Open Patent Application No. 2003-319043

[Patent Document 2] Japanese Laid-Open Patent Application No. 2005-176372

In many portable terminal devices with a rotating display part as described above, the display part is configured so as to rotate +90° and −90° from a reference position (at which the display part is located when unrotated) serving as a center. Accordingly, the position detection part is required to detect these three states (positions). Methods of this position detection include those using non-contact sensors and those using mechanical switches. Of those, methods using non-contact sensors (for example, magnetic sensors), which are stable over time, are commonly adopted.

Conventionally, in the case of detecting the three states of the display part as described above, sensors should be provided for the corresponding states. Specifically, in the case of using, for example, a magnetic sensor as a sensor, the magnetic sensor and a magnet are provided at each of the position of the unrotated display part, the position to which the display part is rotated +90°, and the position to which the display part is rotated −90°. As a result, the conventional portable terminal device has the problem of an increased number of components and an increased number of interconnects (interconnection lines).

SUMMARY OF THE INVENTION

Embodiments of the present invention may solve or reduce the above-described problem.

According to one aspect of the present invention, there are provided a portable terminal device in which the above-described problem may be solved or reduced, and a position detection method used in the portable terminal device.

According to one aspect of the present invention, there are provided a portable terminal device capable of reducing the number of components and the number of interconnects, and a position detection method used in the portable terminal device.

According to one aspect of the present invention, there is provided a portable terminal device including a movable part having a display part; an arm part provided on a base part, the arm part being configured to support the movable part so that the movable part is rotatable in a rotation range of at least ±90° with reference to a rotation center position around a rotation center; and a position detection part configured to detect a rotational position of the movable part relative to the arm part, wherein the position detection part includes a pair of magnets, a pair of one-output magnetic sensors configured to detect magnetic fields of the magnets, and a calculation part configured to determine the rotational position of the movable part based on outputs of the one-output magnetic sensors, the magnets are provided in a first one of the arm part and the movable part so as to be 90° apart from each other around the rotation center, and the one-output magnetic sensors are provided in a second one of the arm part and the movable part so as to oppose the corresponding magnets when the movable part is positioned at the rotation center position.

According to one aspect of the present invention, there is provided a portable terminal device including a movable part having a display part; an arm part provided on a base part, the arm part being configured to support the movable part so that the movable part is rotatable in a rotation range of at least ±90° with reference to a rotation center position around a rotation center; and a position detection part configured to detect a rotational position of the movable part relative to the arm part, wherein the position detection part includes a pair of magnets, a single two-output magnetic sensor configured to detect magnetic fields of the magnets, and a calculation part configured to determine the rotational position of the movable part based on an output of the two-output magnetic sensor, the magnets are provided in a first one of the movable part and the arm part so that the magnets are 180° apart from each other around the rotation center and have respective magnetic fields in a same direction, the two-output magnetic sensor is provided in a second one of the movable part and the arm part, and a first one of the magnets opposes the two-output magnetic sensor in response to a +90° rotation of the movable part from the rotation center position, and a second one of the magnets opposes the two-output magnetic sensor in response to a −90° rotation of the movable part from the rotation center position.

According to one aspect of the present invention, there is provided a portable terminal device including a movable part having a display part; an arm part provided on a base part, the arm part being configured to support the movable part so that the movable part is rotatable in a rotation range of at least ±90° with reference to a rotation center position around a rotation center; and a position detection part configured to detect a rotational position of the movable part relative to the arm part, wherein the position detection part includes a pair of reflectors having different reflection properties, a photoelectric sensor configured to emit light onto the reflectors and detect light reflected therefrom, and a calculation part configured to determine the rotational position of the movable part based on an output of the photoelectric sensor, the reflectors are provided in one of the movable part and the arm part so as to be 180° apart from each other around the rotation center, the photoelectric sensor is provided in the movable part if the reflectors are provided in the arm part or in the base part if the reflectors are provided in the movable part, and a first one of the reflectors opposes the photoelectric sensor in response to a +90° rotation of the movable part from the rotation center position, and a second one of the reflectors opposes the photoelectric sensor in response to a −90° rotation of the movable part from the rotation center position.

According to one aspect of the present invention, there is provided a position detection method used in a portable terminal device, the portable terminal device including a movable part having a display part; an arm part provided on a base part, the arm part being configured to support the movable part so that the movable part is rotatable in a rotation range of at least ±90° with reference to a rotation center position around a rotation center; and a position detection part configured to detect a rotational position of the movable part relative to the arm part, wherein paired magnets are provided in a first one of the arm part and the movable part so as to be 90° apart from each other around the rotation center, paired one-output magnetic sensors are provided in a second one of the arm part and the movable part so as to be 90° apart from each other around the rotation center, and it is determined that the rotational position of the movable part is one of +90° and −90° from the rotation center position in response to the one-output magnetic sensors outputting different signals during a rotation of the movable part relative to the arm part.

According to one aspect of the present invention, there is provided a portable terminal device including a movable part having a display part; an arm part provided on a base part, the arm part being configured to support the movable part so that the movable part is rotatable in a rotation range of at least ±90° with reference to a rotation center position around a rotation center; and a position detection part configured to detect a rotational position of the movable part relative to the arm part, wherein the position detection part includes a magnet, a pair of magnetic sensors configured to detect a magnetic field of the magnet, and a calculation part configured to determine the rotational position of the movable part based on outputs of the magnetic sensors, the magnet is provided in a first one of the movable part and the arm part, and the magnetic sensors are provided in a second one of the movable part and the arm part so that at least one of the magnetic sensors is positioned at a corresponding one of boundaries of a region over which the magnetic field of the magnet extends with the movable part being at the rotation center position.

According to one aspect of the present invention, there is provided a portable terminal device including a movable part having a display part; an arm part provided on a base part, the arm part being configured to support the movable part so that the movable part is rotatable in a rotation range of at least ±90° with reference to a rotation center position around a rotation center; and a position detection part configured to detect a rotational position of the movable part relative to the arm part, wherein the position detection part includes a pair of first and second magnets, a pair of first and second magnetic sensors configured to detect magnetic fields of the first and second magnets, and a calculation part configured to determine the rotational position of the movable part based on outputs of the first and second magnetic sensors, and the first and second magnets are provided in a first one of the movable part and the arm part so as to be apart from each other by a first predetermined degree with reference to the rotation center position around the rotation center, and the first and second magnetic sensors are provided in a second one of the movable part and the arm part so as to be offset from first and second positions opposing the first and second magnets, respectively, to be apart from each other by a second predetermined degree with the movable part being at the rotation center position, one of the first predetermined degree and the second predetermined degree being 90°, so that the first and second magnetic sensors switch respective output signals at different timings.

Thus, according to embodiments of the present invention, it is possible to detect at least three states of a movable part with two magnets and two one-output magnetic sensors, two magnets and a single two-output magnetic sensor, two reflectors and a single photoelectric sensor, or a single magnet and two magnetic sensors. Accordingly, compared with the conventional configuration where components such as a sensor are provided for each of the positions corresponding to the three states, it is possible to reduce the number of components and the number of interconnects.

BRIEF DESCRIPTION OF THE DRAWINGS

Other objects, features and advantages of the present invention will become more apparent from the following detailed description when read in conjunction with the accompanying drawings, in which:

FIG. 3 is a table showing the correspondence between sensor outputs and the states (positions) of the movable part in the cellular phone according to the first embodiment of the present invention;

FIG. 7 is a table showing the correspondence between the sensor outputs and the states (positions) of the movable part in the cellular phone according to the second embodiment of the present invention;

FIG. 18 is a table showing the correspondence between the sensor outputs and the status of the movable part in the cellular phone according to the eighth embodiment of the present invention;

FIG. 22 is a table showing the correspondence between the sensor outputs and the states (positions) of the movable part in the cellular phone according to the ninth embodiment of the present invention;

FIGS. 25A through 25C are diagrams for illustrating variations caused in magnetic sensors, where FIG. 25A is a timing chart showing the outputs of the first and second magnetic sensors without variations, FIG. 25B is a timing chart showing the outputs of the first and second magnetic sensors with a first variation, and FIG. 25C is a timing chart showing the outputs of the first and second magnetic sensors with a second variation;

DETAILED DESCRIPTION OF THE PREFERRED EMBODIMENTS

A description is given below, with reference to the accompanying drawings, of embodiments of the present invention.

Figure 1:
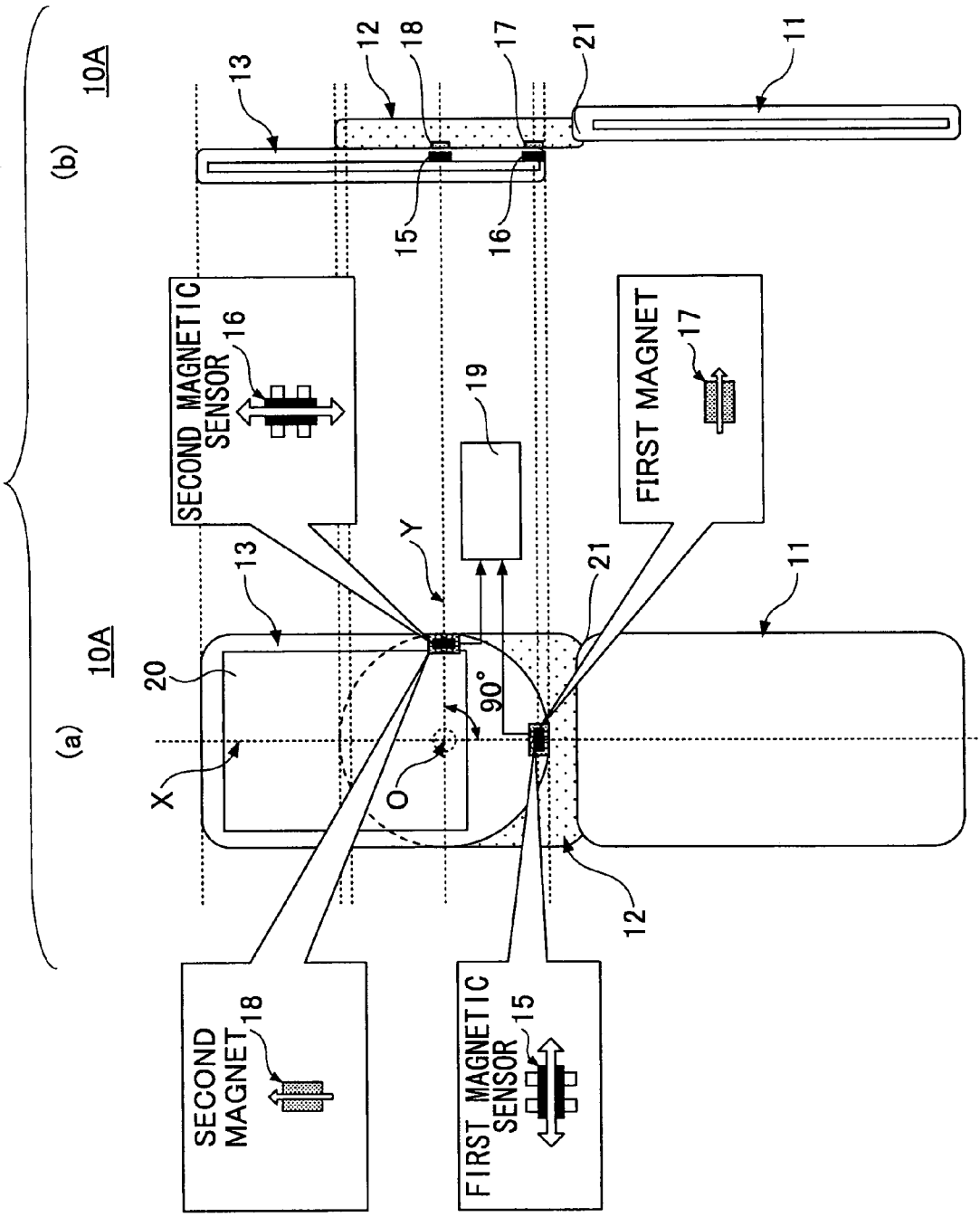
FIG. 1 is a diagram for illustrating a configuration of a cellular phone according to a first embodiment of the present invention, in which (a) and (b) are a front view and a right side view, respectively, of the cellular phone.
Figure 2:
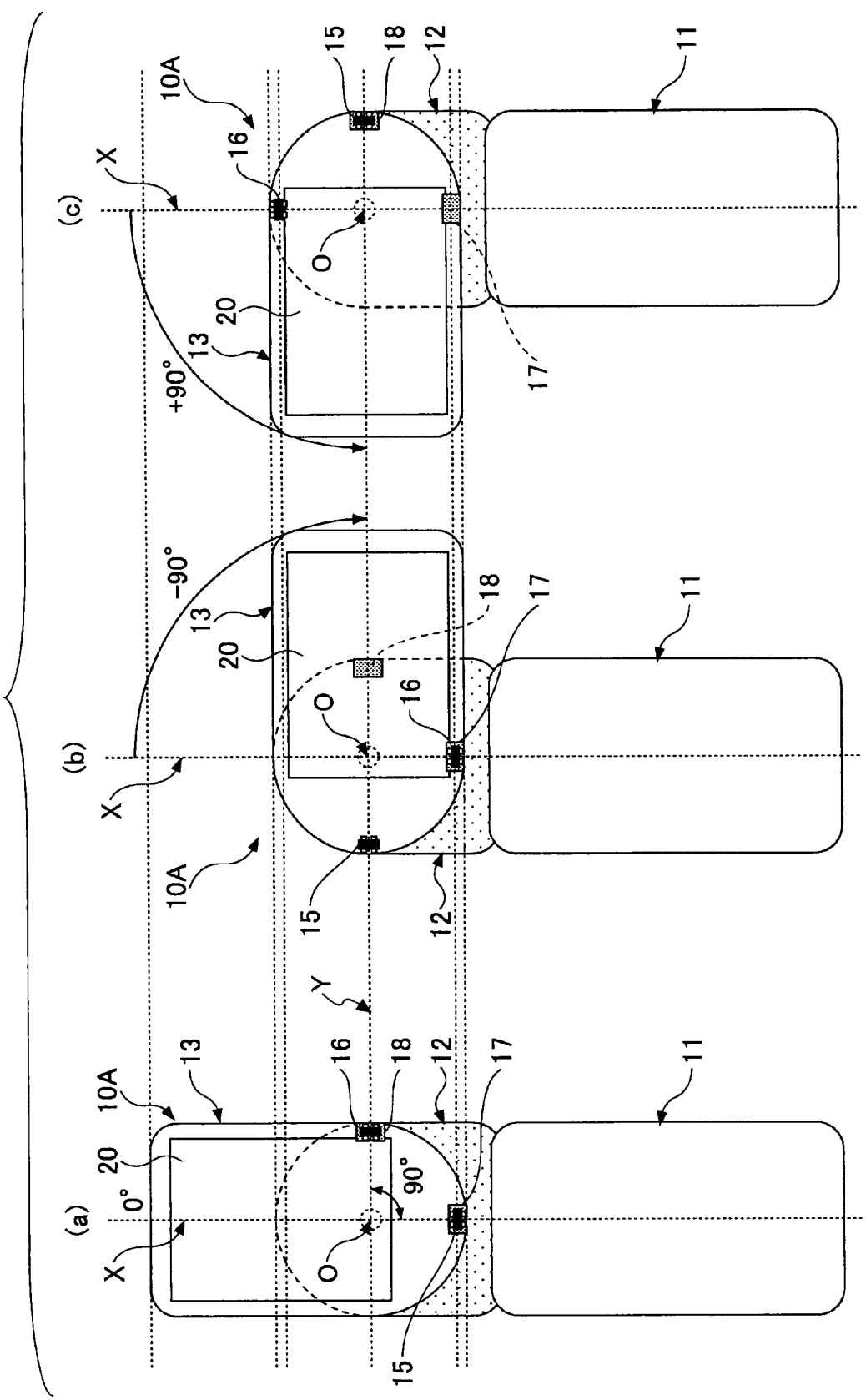
FIG. 2 is a diagram for illustrating an operation of the cellular phone according to the first embodiment of the present invention, in which (a) shows the state where a movable part is at a rotation center position, (b) shows the state where the movable part is rotated −90°, and (c) shows the state where the movable part is rotated +90°.

FIGS. 1 and 2 are diagrams showing a portable terminal device according to a first embodiment of the present invention. In this embodiment, a description is given, taking a cellular phone 10A as an example of the portable terminal device. The cellular phone 10A includes a fixed part 11, an arm part 12, a movable part 13, and a position detection part.

The fixed part 11 is held by an operator when the cellular phone 10A is operated. The arm part 12 is attached to the fixed part 11 through a hinge part 21. Accordingly, the arm part 12 is foldable relative to the fixed part 11. Further, on the interior side of the fixed part 11, various operations keys (such as alphanumeric keys, a power key, a call key, a menu key, a phone book key, and a cursor key), which are not graphically illustrated, are arranged, and a microphone for making conversation is provided at the position farthest from the hinge part 21.

The movable part 13 is rotatably attached to the arm part 12. A display part 20 is provided on the interior side of the movable part 13. Further, a speaker for making conversation is provided at a part distant from the hinge part 21. The display part 20 is a liquid crystal display unit (hereinafter referred to as "liquid crystal display part 20"), and has substantially the same size as the movable part 13 in order to be large in size.

The movable part 13 is configured to be rotatable ±90° from a position at which the movable part 13 is located when unrotated as shown in (a) of FIG. 1 and (a) of FIG. 2 (hereinafter referred to as "rotation center position") around a rotation center O relative to the arm part 12. In FIG. 2, (b) shows the state where the movable part 13 is rotated −90°, and (c) shows the state where the movable part 13 is rotated +90°.

Here, the liquid crystal display part 20 is in a portrait position, where the length (vertical dimension) of the liquid crystal display part 20 is greater than the width (horizontal dimension) thereof, when the movable part 13 is at the rotation center position. Further, when the arm part 12 is folded with the movable part 13 being at the rotation center position, the arm part 12 and the movable part 13 are placed over the fixed part 11. Accordingly, making the movable part 13 rotatable relative to the arm part 12 does not reduce the portability of the cellular phone 10A.

Further, the cellular phone 10A has a substantially L-letter shape as a whole in the states shown in (b) and (c) of FIG. 2, where the movable part 13 is rotated −90° and +90°, respectively, from its rotation center position. Accordingly, the liquid crystal display part 20 (movable part 13) is in a landscape position, where the width (horizontal dimension) of the liquid crystal display part 20 is greater than the length (vertical dimension) thereof, to be oriented suitably for the time when a television picture is displayed or a long sentence is necessary.

In the first embodiment and second through seventh embodiments, the counterclockwise rotation of the movable part 13 around the rotation center O is referred to as a plus (+) directional rotation and the clockwise rotation of the movable part 13 around the rotation center O is referred to as a minus (−) directional rotation. Further, a longitudinal center line passing through the rotation center O is referred to as a rotation center position line (indicated by arrow X in the drawings). For convenience of description, in eighth through 11$^{th}$ embodiments, the counterclockwise rotation of the movable part 13 around the rotation center O is referred to as a minus (−) directional rotation and the clockwise rotation of the movable part 13 around the rotation center O is referred to as a plus (+) directional rotation.

Next, a description is given of the position detection part. The position detection part according to this embodiment includes first and second magnetic sensors 15 and 16 (a pair of one-output magnetic sensors), first and second magnets 17 and 18, and a position calculation unit 19. The first and second magnetic sensors 15 and 16 may be magnetoresistive (MR) elements.

The first and second magnetic sensors 15 and 16 detect magnetic fields with respect to respective directions indicated by double-headed arrows in (a) of FIG. 1. Each of the first and second magnetic sensors 15 and 16 is configured to output an L (low-level) signal in response to detection of a magnetic field, and to output an H (high-level) signal when no magnetic field is applied. However, although the first and second magnetic sensors 15 and 16 can detect application of a magnetic field as described above, the first and second magnetic sensors 15 and 16 cannot detect the direction of application of the magnetic field. The first and second magnetic sensors 15 and 16 are disposed in the movable part 13 so as to be 90° apart from each other around the rotation center O.

The first and second magnets 17 and 18 are permanent magnets, and are fixed to the arm part 12. Further, the magnetic fluxes of the first and second magnets 17 and 18 are oriented in the directions indicated by corresponding arrows in (a) of FIG. 1. The first and second magnets 17 and 18 are also disposed so as to be 90° apart from each other around the rotation center O.

Specifically, the first magnet 17 is provided so as to be positioned on the rotation center position line X below the rotation center O. Further, the second magnet 18 is provided at a position on the right side of the rotation center O on a line that is perpendicular to the rotation center position line X and passes through the rotation center O (a broken line indicated by arrow Y in the drawings). In other words, the second magnet 18 is provided at a position −90° apart from the rotation center position line X.

The positions at which the first and second magnetic sensors 15 and 16 are provided and the positions at which the first and second magnets 17 and 18 are provided are determined so that the first and second magnetic sensors 15 and 16 are opposite to (face to face with) the first and second magnets 17 and 18, respectively, when the movable part 13 is at the rotation center position. Accordingly, when the movable part 13 is at the rotation center position, each of the first and second magnetic sensors 15 and 16 outputs an L signal. In this specification, that a magnetic sensor and a magnet are opposite to each other means the state where the magnetic sensor is detecting a magnetic field generated by the magnet, and does not necessarily mean that the magnetic sensor and the magnet are facing each other.

The first and second magnetic sensors 15 and 16 are connected to the position calculation unit 19. As described below, the position calculation unit 19 figures out the position of the movable part 13 based on the combination of the L signal and the H signal transmitted from the first and second magnetic sensors 15 and 16.

Next, a description is given below, with reference principally to FIG. 2, of the operation of detecting the position of the movable part 13 performed by the position detection part in the cellular phone 10A having the above-described configuration.

In FIG. 2, (a) shows the state where the movable part 13 is at the rotation center position, which may serve as a reference position. This state is referred to as Detection State A. Further, the rotation angle of the movable part is determined as 0° when the movable part 13 is in Detection State A. When the movable part 13 is in this Detection State A (at the rotation center position), the liquid crystal display part 20 is in a portrait position.

In FIG. 2, (b) shows the state where the movable part 13 is rotated −90° from Detection State A. This state is referred to as Detection State B. Further, (c) of FIG. 2 shows the state where the movable part 13 is rotated +90° from Detection State A. This state is referred to as Detection State C. In these Detection States B and C, the liquid crystal display part 20 is in a landscape position.

Next, a description is given of the positional relationship between the first and second magnetic sensors 15 and 16 and the first and second magnets 17 and 18 in Detection States A through C. When the movable part 13 is in Detection State A shown in (a) of FIG. 2, the first magnetic sensor 15 is opposite to the first magnet 17, and the second magnetic sensor 16 is opposite to the second magnet 18. Accordingly, the magnetic field of the first magnet 17 acts on the first magnetic sensor 15, so that the first magnetic sensor 15 outputs an L signal. Likewise, the magnetic field of the second magnet 18 acts on the second magnetic sensor 16, so that the second magnetic sensor 16 also outputs an L signal.

Further, when the movable part 13 is rotated −90° from Detection State A to be in Detection State B, the first magnetic sensor 15 is spaced from each of the magnets 17 and 18, and the second magnetic sensor 16 is opposite to the first magnet 17. Accordingly, neither of the magnetic fields of the magnets 17 and 18 acts on the first magnetic sensor 15, so that the first magnetic sensor 15 outputs an H signal. On the other hand, the magnetic field of the first magnet 17 acts on the second magnetic sensor 16, so that the second magnetic sensor 16 outputs the L signal.

Further, when the movable part 13 is rotated +90° from Detection State A to be in Detection State C, the second magnetic sensor 16 is spaced from each of the magnets 17 and 18, and the first magnetic sensor 15 is opposite to the second magnet 18. Accordingly, neither of the magnetic fields of the magnets 17 and 18 acts on the second magnetic sensor 16, so that the second magnetic sensor 16 outputs an H signal. On the other hand, the magnetic field of the second magnet 18 acts on the first magnetic sensor 15, so that the first magnetic sensor 15 outputs the L signal.

FIG. 3 is a table of the relationship between the outputs of the first and second magnetic sensors 15 and 16 and Detection States A through C of the movable part 13. As shown in FIG. 3, according to the cellular phone 10A of this embodiment, the position of the movable part 13 is detected based on the combination of the outputs of the two magnetic sensors 15 and 16.

Therefore, in the cellular phone 10A, it is possible to detect the three states of Detection States A through C of the movable part 13 with the two magnetic sensors 15 and 16 and the two magnets 17 and 18. Further, if the outputs of the first and second magnetic sensors 15 and 16 are both H signals, the movable part 13 is at a position within the range of 0° to −90° or 0° to +90°. Including these ranges, it is possible to detect four states in total.

Thus, according to this embodiment, by determining the positions at which the first and second magnetic sensors 15 and 16 are provided and the positions at which the first and second magnets 17 and 18 are provided as described above, it is possible to detect the position of the movable part 13 at four points with two pairs of a sensor and a magnet. Accordingly, unlike in the conventional portable terminal device, there is no need to dispose a magnetic sensor and a magnet at each of the positions corresponding to Detection States A through C, so that it is possible to reduce the number of components and the number of interconnects compared with the conventional portable terminal device.

Further, in the case of providing magnetic sensors in the movable part 13 as in this embodiment, it is common to provide the position calculation unit 19 in the fixed part 11.

Accordingly, it is necessary to extend the interconnects (interconnection lines) of the magnetic sensors 15 and 16 from the movable part 13 to the fixed part 11 through the hinge part 21. In the cellular phone 10A according to this embodiment, since the number of magnetic sensors can be reduced compared with the conventional portable terminal device as described above, it is possible to facilitate wiring in the hinge part 21.

Figure 4:
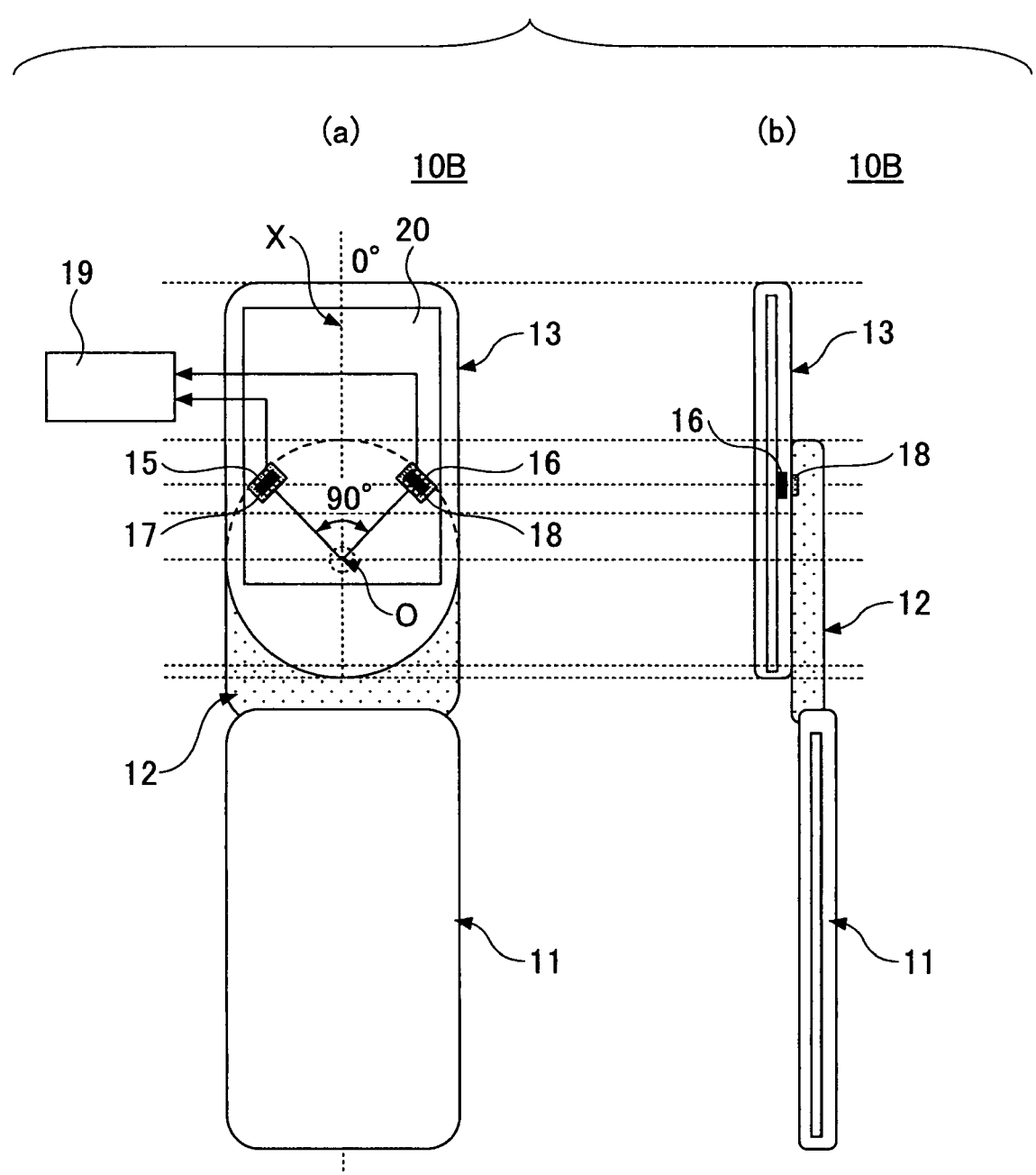
FIG. 4 is a diagram for illustrating a configuration of a cellular phone according to a second embodiment of the present invention, in which (a) and (b) are a front view and a right side view, respectively, of the cellular phone.
Figure 5:
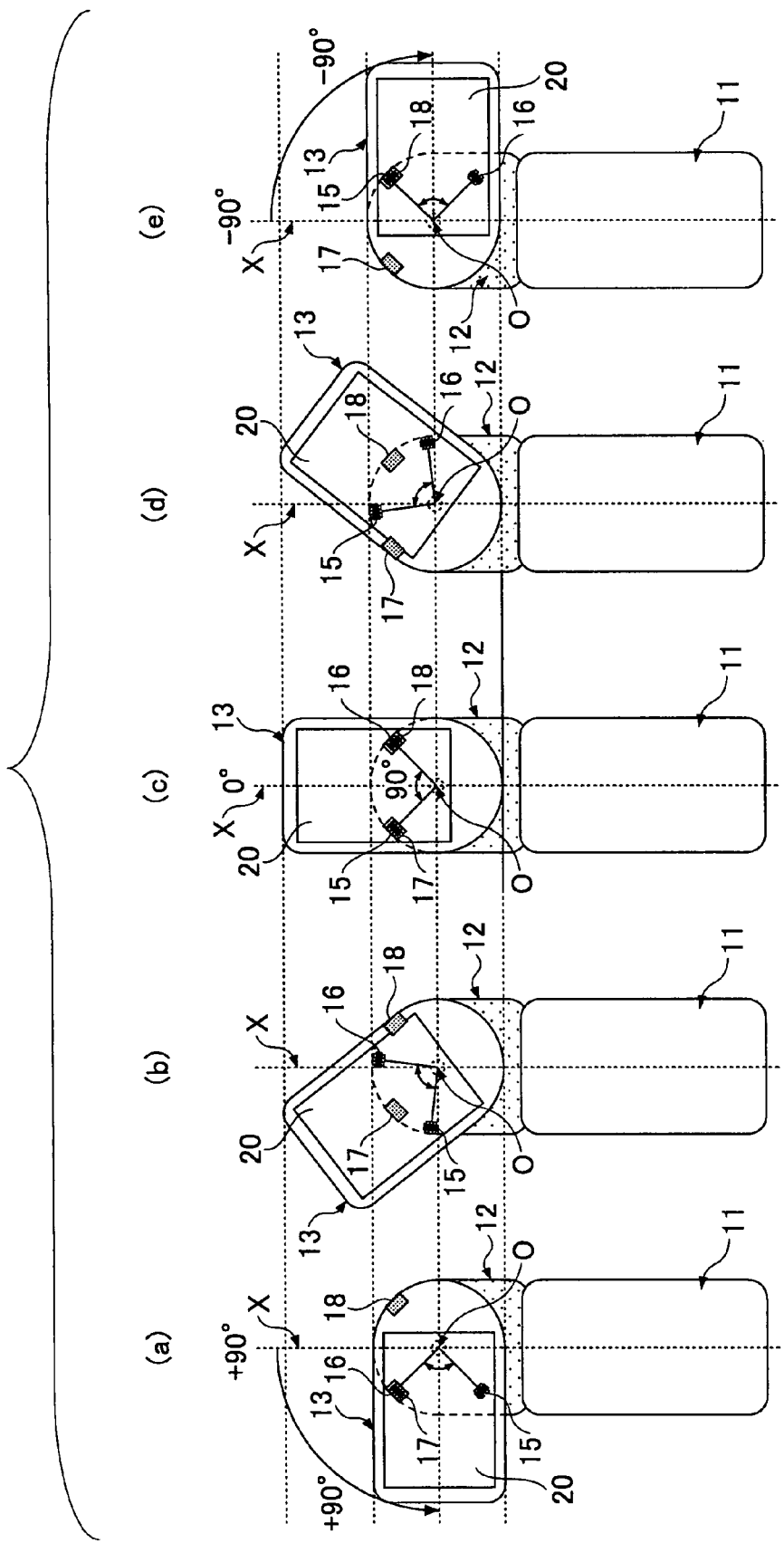
FIG. 5 is a diagram for illustrating an operation of the cellular phone according to the second embodiment of the present invention, in which (a) shows the state where the movable part is rotated +90°, (b) shows the state where the movable part is rotated +45°, (c) shows the state where the movable part is at the rotation center position, (d) shows the state where the movable part is rotated −45°, and (e) shows the state where the movable part is rotated −90°.

Next, a description is given of the second embodiment of the present invention. FIGS. 4 and 5 are diagrams for illustrating a cellular phone 10B according to the second embodiment of the present invention. In the drawings used for illustrating this and following embodiments, the same elements as those shown in FIGS. 1 through 3 used for illustrating the first embodiment are referred to by the same reference numerals, and a description thereof is omitted.

In the cellular phone 10A according to the first embodiment, the first magnet 17 is provided so as to be positioned on the rotation center position line X below the rotation center O, and the second magnet 18 is provided at a position on the right side of the rotation center O on the line Y that is perpendicular to the rotation center position line X and passes through the rotation center O. Further, the first and second magnetic sensors 15 and 16 are opposite to (face to face with) the first and second magnets 17 and 18, respectively, when the movable part 13 is at the rotation center position.

On the other hand, the cellular phone 10B according to this embodiment is equal to the cellular phone 10A of the first embodiment in that the first and second magnetic sensors 15 and 16 are disposed in the movable part 13 so as to be 90° apart from each other around the rotation center O and that the first and second magnets 17 and 18 are disposed in the arm parts 12 so as to be 90° apart from each other around the rotation center O. However, the cellular phone 10B is different from the cellular phone 10A in that the first magnetic sensor 15 is provided at the position of +45° from the rotation center position line X and the second magnetic sensor 16 is provided at the position of −45° from the rotation center position line X and that the first magnet 17 is provided at the position of +45° from the rotation center position line X and the second magnet 18 is provided at the position of −45° from the rotation center position line X.

Next, a description is given, with reference principally to FIG. 5, of the operation of detecting the position of the movable part 13 performed by the position detection part in the cellular phone 10B according to this embodiment.

When the movable part 13 is in Detection State C shown in (a) of FIG. 5, the first magnetic sensor 15 is spaced from each of the magnets 17 and 18, and the second magnetic sensor 16 is opposite to the first magnet 17. Accordingly, neither of the magnetic fields of the magnets 17 and 18 acts on the first magnetic sensor 15, so that the first magnetic sensor 15 outputs an H signal. On the other hand, the magnetic field of the first magnet 17 acts on the second magnetic sensor 16, so that the second magnetic sensor 16 outputs an L signal.

When the movable part 13 is at a position between Detection States A and C shown in (b) of FIG. 5, both of the first and second magnetic sensors 15 and 16 are spaced from each of the magnets 17 and 18. Accordingly, neither of the magnetic fields of the magnets 17 and 18 acts on the first and second magnetic sensors 15 and 16, so that each of the first and second magnetic sensors 15 and 16 outputs an H signal.

When the movable part 13 is in Detection State A (at the rotation center position) shown in (c) of FIG. 5, the first magnetic sensor 15 is opposite to the first magnet 17, and the second magnetic sensor 16 is opposite to the second magnet 18. Accordingly, the magnetic field of the first magnet 17 acts on the first magnetic sensor 15, so that the first magnetic sensor 15 outputs an L signal, and the magnetic field of the second magnet 18 acts on the second magnetic sensor 16, so that the second magnetic sensor 16 also outputs an L signal.

When the movable part 13 is at a position between Detection States A and B shown in (d) of FIG. 5, both of the first and second magnetic sensors 15 and 16 are spaced from each of the magnets 17 and 18. Accordingly, neither of the magnetic fields of the magnets 17 and 18 acts on the first and second magnetic sensors 15 and 16, so that each of the first and second magnetic sensors 15 and 16 outputs an H signal.

When the movable part 13 is in Detection State B shown in (e) of FIG. 5, the first magnetic sensor 15 is opposite to the second magnet 18, and the second magnetic sensor 16 is spaced from each of the magnets 17 and 18. Accordingly, the magnetic field of the second magnet 18 acts on the first magnetic sensor 15, so that the first magnetic sensor 15 outputs an L signal. On the other hand, neither of the magnetic fields of the magnets 17 and 18 acts on the second magnetic sensor 16, so that the second magnetic sensor 16 outputs the H signal.

Figure 6:
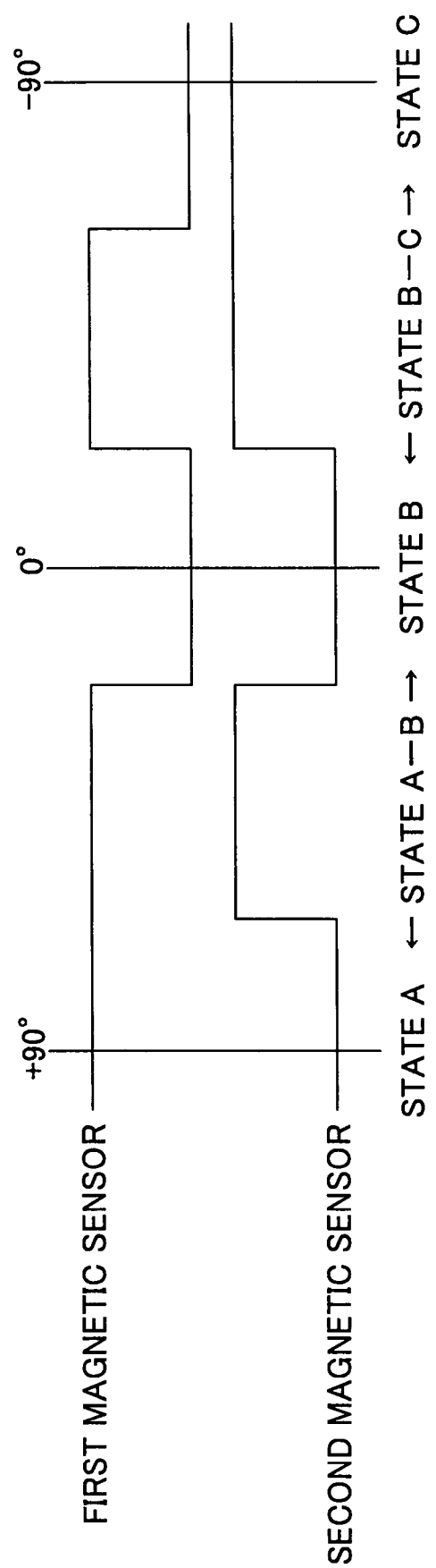
FIG. 6 is a timing chart showing sensor outputs in the cellular phone according to the second embodiment of the present invention.

FIGS. 6 and 7 show the relationship between the outputs of the first and second magnetic sensors 15 and 16 and Detection States A through C of the movable part 13. As shown in FIGS. 6 and 7, in the cellular phone 10B of this embodiment also, it is possible to detect the three states of Detection States A through C of the movable part 13 with the two magnetic sensors 15 and 16 and the two magnets 17 and 18. Further, if the outputs of the first and second magnetic sensors 15 and 16 are both H signals, the movable part 13 is at a position within the range of 0° to −90° or 0° to +90°. Including these ranges, it is possible to detect four states in total.

Thus, in the cellular phone 10B according to this embodiment also, it is possible to detect the position of the movable part 13 at four points with two pairs of a sensor and a magnet. Accordingly, unlike in the conventional portable terminal device, there is no need to dispose a magnetic sensor and a magnet at each of the positions corresponding to Detection States A through C, so that it is possible to reduce the number of components and the number of interconnects compared with the conventional portable terminal device. Further, since the number of magnetic sensors can be reduced compared with the conventional portable terminal device, it is possible to facilitate wiring in the hinge part 21.

Figure 8:
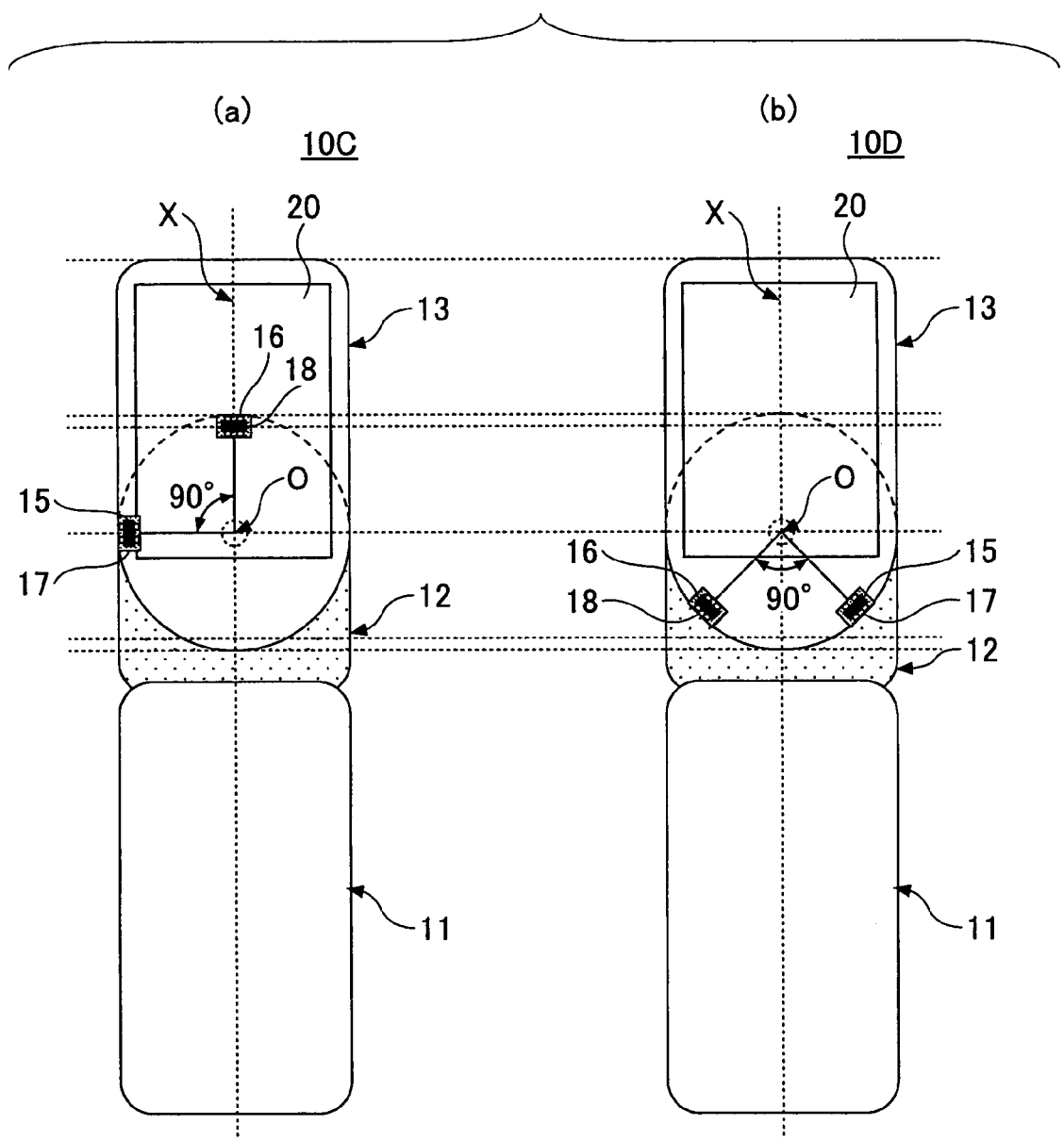
FIG. 8 is a diagram showing cellular phones according to a third embodiment and a fourth embodiment of the present invention, in which (a) is a front view of the cellular phone according to the third embodiment and (b) is a front view of the cellular phone according to the fourth embodiment.

FIG. 8 is a diagram showing a cellular phone 10C and a cellular phone 10D according to the third and fourth embodiments, respectively, of the present invention. The cellular phones 10C and 10D according to the third and fourth embodiments, respectively, are equal to the cellular phones 10A and 10B according to the first and second embodiments in that the first and second magnetic sensors 15 and 16 are disposed in the movable part 13 so as to be 90° apart from each other around the rotation center O and that the first and second magnets 17 and 18 are disposed in the arm parts 12 so as to be 90° apart from each other around the rotation center O.

However, according to the cellular phone 10C of the third embodiment shown in (a) of FIG. 8, the first magnetic sensor 15 is provided at the position +90° apart from the rotation center position line X and the second magnetic sensor 16 is provided at a position above the rotation center O on the rotation center position line X, and the first magnet 17 is provided at the position +90° apart from the rotation center position line X and the second magnet 18 is provided at a position above the rotation center O on the rotation center position line X. Further, according to the cellular phone 10D of the third embodiment shown in (b) of FIG. 8, the first magnetic sensor 15 is provided at the position +135° apart from the rotation center position line X and the second magnetic sensor 16 is provided at the position −135° apart from the rotation center position line X, and the first magnet 17 is provided at the position +135° apart from the rotation center position line X and the second magnet 18 is provided at the position −135° apart from the rotation center position line X. Each of the cellular phones 10C and 10D according to the third and fourth embodiments, respectively, has the same basic structure and produces the same effects as the cellular phone 10A according to the first embodiment and the cellular phone 10B according to the second embodiment.

Figure 9:
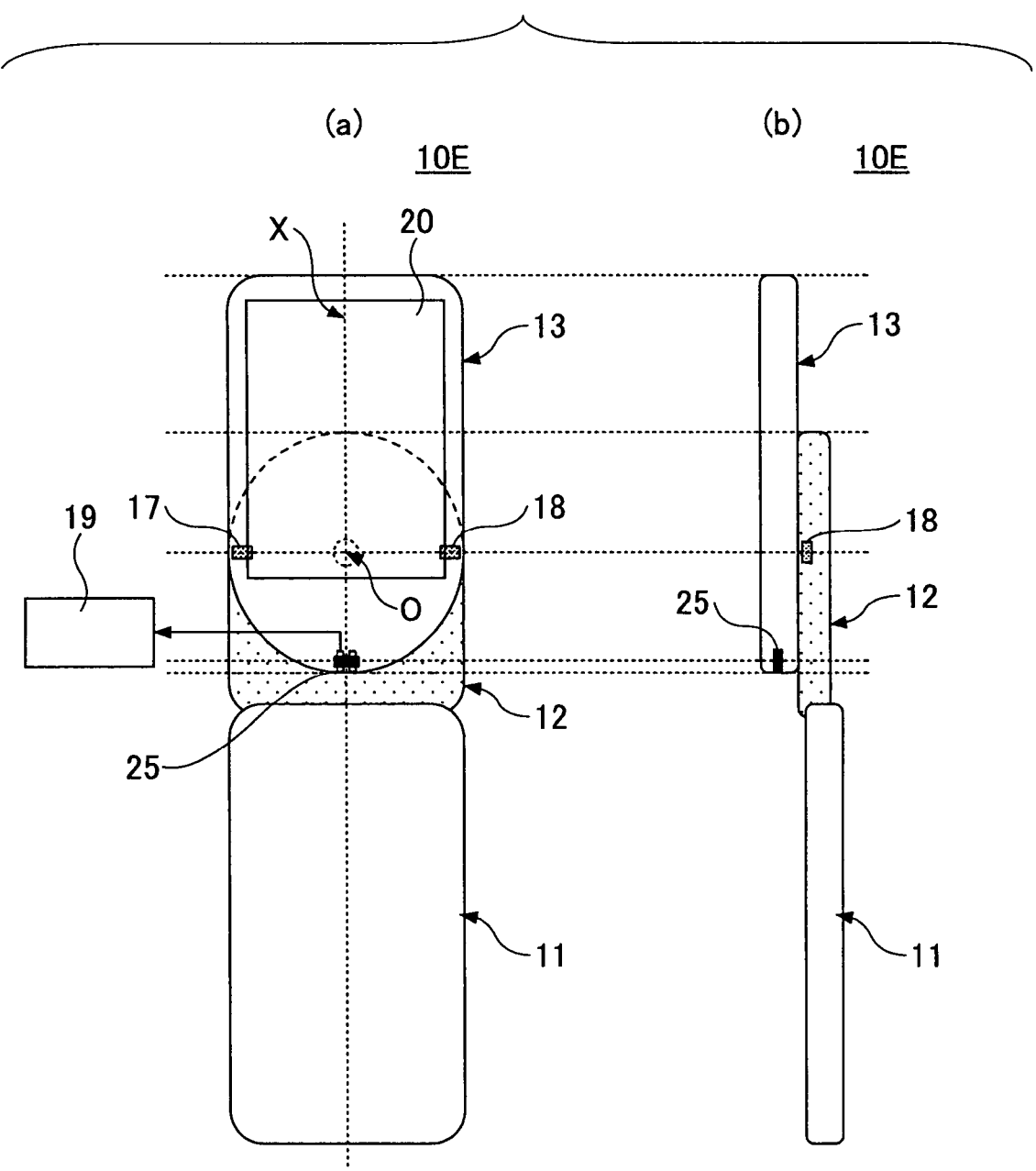
FIG. 9 is a diagram for illustrating a configuration of a cellular phone according to a fifth embodiment of the present invention, in which (a) and (b) are a front view and a right side view, respectively, of the cellular phone.
Figure 10:
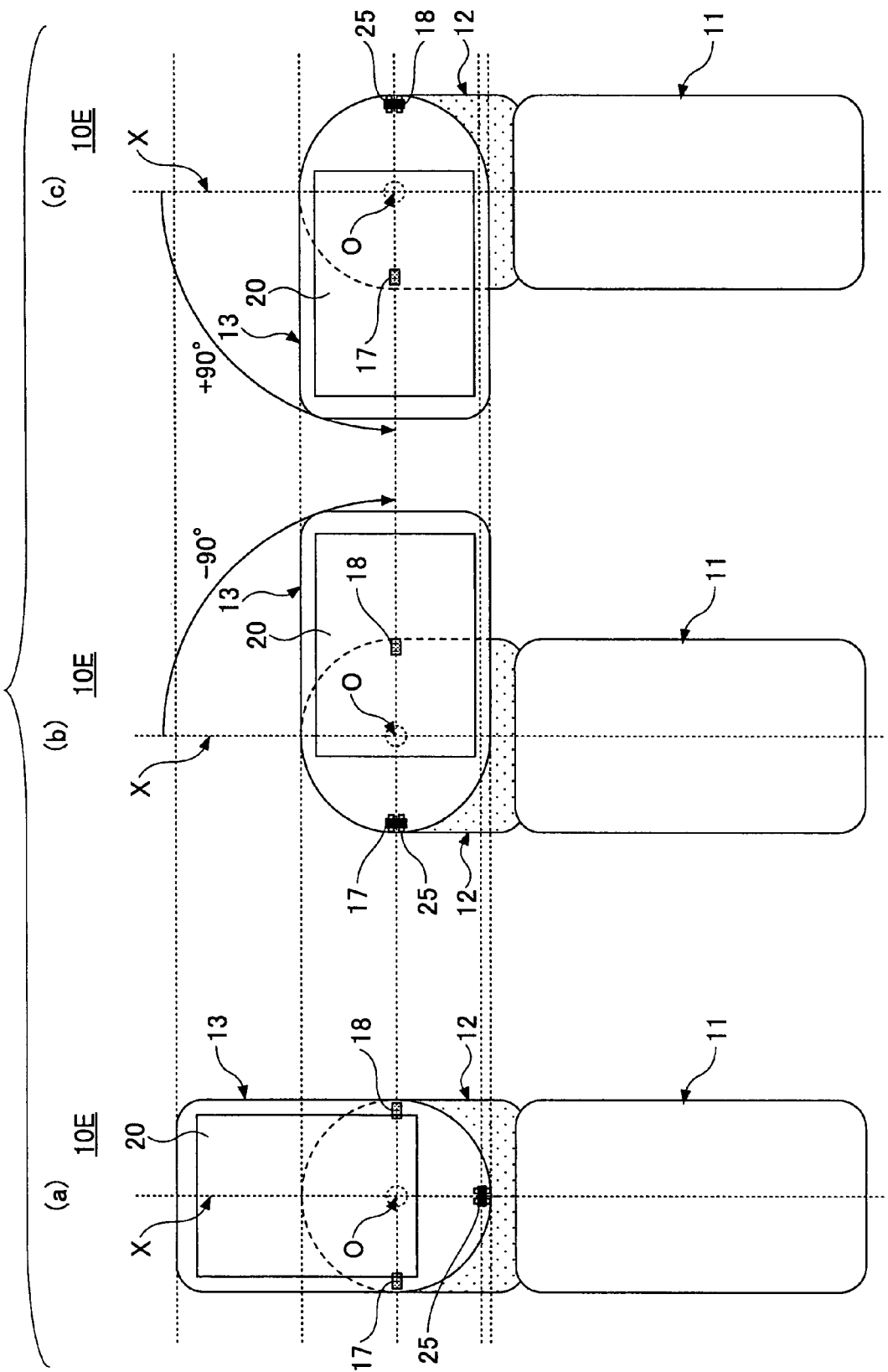
FIG. 10 is a diagram for illustrating an operation of the cellular phone according to the fifth embodiment of the present invention, in which (a) shows the state where the movable part is at the rotation center position, (b) shows the state where the movable part is rotated −90°, and (c) shows the state where the movable part is rotated +90°.

Next, a description is given of the fifth embodiment of the present invention. FIGS. 9 and 10 are diagrams showing a cellular phone 10E according to the fifth embodiment of the present invention. According to the cellular phone 10E of this embodiment, the position detection part includes a single magnetic sensor 25 (a two-output magnetic sensor), the first and second magnets 17 and 18, and the position calculation unit 19. The magnetic sensor 25 may be a Hall element.

Each of the magnetic sensors 15 and 16 used in the above-described first and second embodiments is configured to switch outputs (an H signal and an L signal) in accordance with the presence or absence of application of a magnetic field. On the other hand, the magnetic sensor 25 used in this embodiment is configured to be able to output different signals based on directions in which a magnetic field is applied.

Specifically, if a magnetic field is applied in a first direction of the magnetic sensor 25, the magnetic sensor 25 outputs a first signal having a first attribute. On the other hand, if a magnetic field is applied in the direction opposite to the first direction (referred to as "second direction"), the magnetic sensor 25 outputs a second signal having an attribute (second attribute) different from the first attribute. Referring to FIG. 9, this magnetic sensor 25 is positioned below the rotation center O on the rotation center position line X in the movable part 13 with the movable part 13 being at the rotation center position (in Detection State A).

The first and second magnets 17 and 18 are permanent magnets, and are fixed to the arm part 12. Further, the magnetic flux of each of the first and second magnets 17 and 18 is oriented in an upward direction parallel to the rotation center position line X in FIG. 9. Further, the first magnet 17 is disposed at the position of +90° from the rotation center position line X, and the second magnet 18 is disposed at the position of −90° from the rotation center position line X. Accordingly, the first and second magnets 17 and 18 are disposed symmetrically with respect to the rotation center position line X so as to be 180° apart from each other around the rotation center O.

The magnetic sensor 25 is connected to the position calculation unit 19. This position calculation unit 19 figures out the position of the movable part 13 based on the combination of the first signal and the second signal transmitted from the magnetic sensor 25.

Next, a description is given, with reference principally to FIG. 10, of the operation of detecting the position of the movable part 13 performed by the position detection part in the cellular phone 10E having the above-described configuration.

When the movable part 13 is in Detection State A shown in (a) of FIG. 10, the magnetic sensor 25 is spaced from each of the first and second magnets 17 and 18. Accordingly, neither of the magnetic fields of the magnets 17 and 18 acts on the magnetic sensor 25, so that the magnetic sensor 25 outputs no signal.

Further, when the movable part 13 is rotated −90° from Detection State A to be in Detection State B as shown in (b) of FIG. 10, the magnetic sensor 25 is opposite to the first magnet 17. Accordingly, the magnetic field of the first magnet 17 acts on the magnetic sensor 25. At this point, the magnetic sensor 25 outputs a signal. In this embodiment, it is assumed that the first signal is output at this point.

Further, when the movable part 13 is rotated +90° from Detection State A to be in Detection State C as shown in (c) of FIG. 10, the magnetic sensor 25 is opposite to the second magnet 18. Accordingly, the magnetic field of the second magnet 18 acts on the magnetic sensor 25.

At this point, the movable part is rotated 180° from Detection State B. Accordingly, the vertical orientation of the magnetic sensor 25 is reversed compared with when the magnetic sensor 25 is opposite to the first magnet 17 in Detection State B. Further, the magnetic fields of the magnets 17 and 18 have the same direction as described above. Accordingly, the output signal of the magnetic sensor 25 in Detection State C is the second signal different from the output at the time of Detection State B.

As described above, in the cellular phone 10E according to this embodiment also, different signals are output from the magnetic sensor 25 when the movable part 13 is at the respective positions of Detection States A through C. Accordingly, the position calculation unit 19 can detect the position of the movable part 13 based on the signal transmitted from the magnetic sensor 25. Further, according to this embodiment, the number of sensors can be further reduced by one compared with the above-described cellular phones 10A through 10D according to the first through fourth embodiments. Accordingly, it is possible to further reduce the number of components and further facilitate wiring.

In the above-described first through fifth embodiments, the magnetic sensors 15 and 16 or the magnetic sensor 25 is provided in the movable part 13, while the magnets 17 and 18 are provided in the arm part 12 (fixed part 11). However, the same effects can also be produced by providing the magnets 17 and 18 in the movable part 13 and providing the sensors 15 and 16 or the magnetic sensor 25 in the arm part 12 (fixed part 11).

Figure 11:
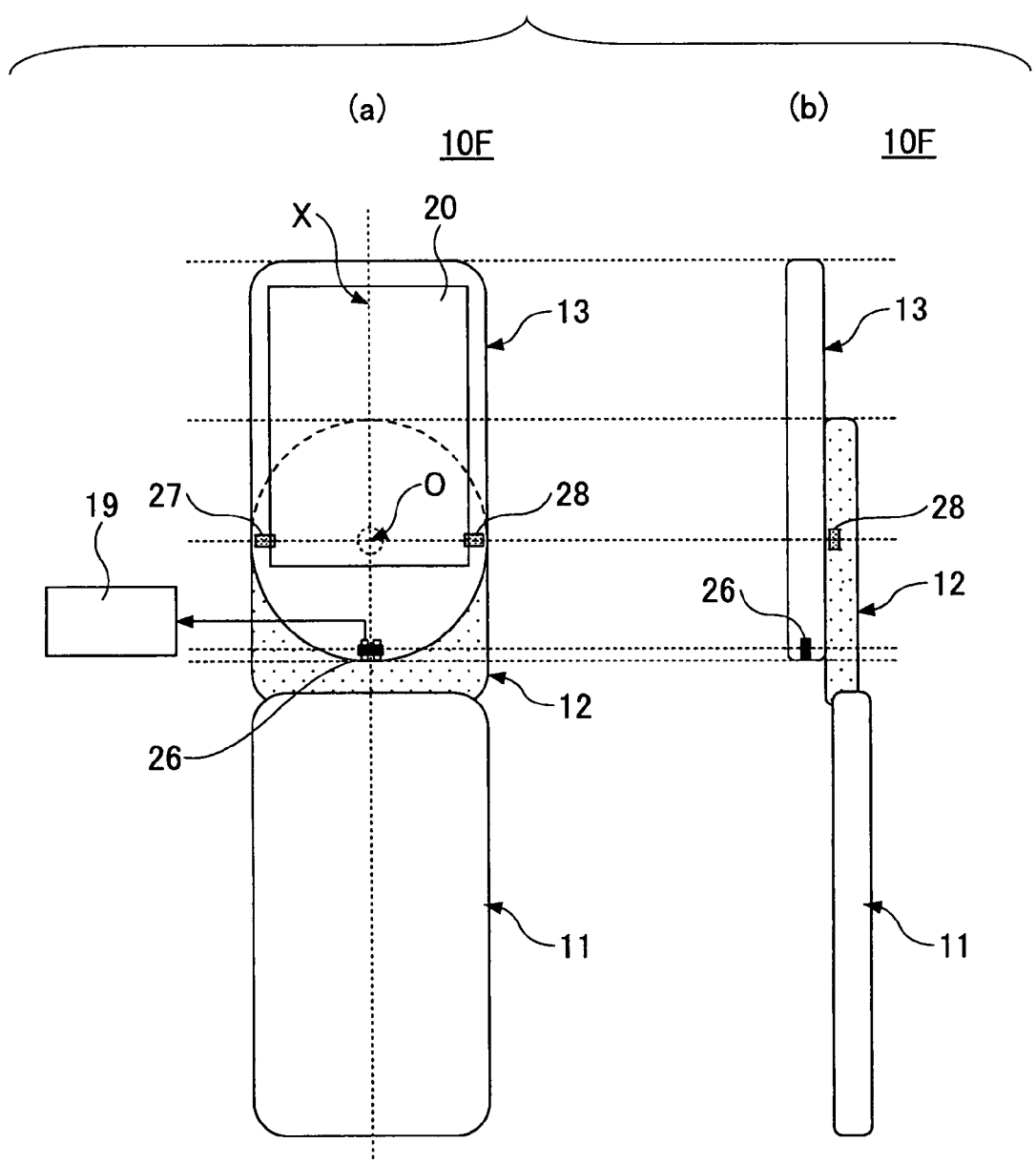
FIG. 11 is a diagram for illustrating a configuration of a cellular phone according to a sixth embodiment of the present invention, in which (a) and (b) are a front view and a right side view, respectively, of the cellular phone.
Figure 12:
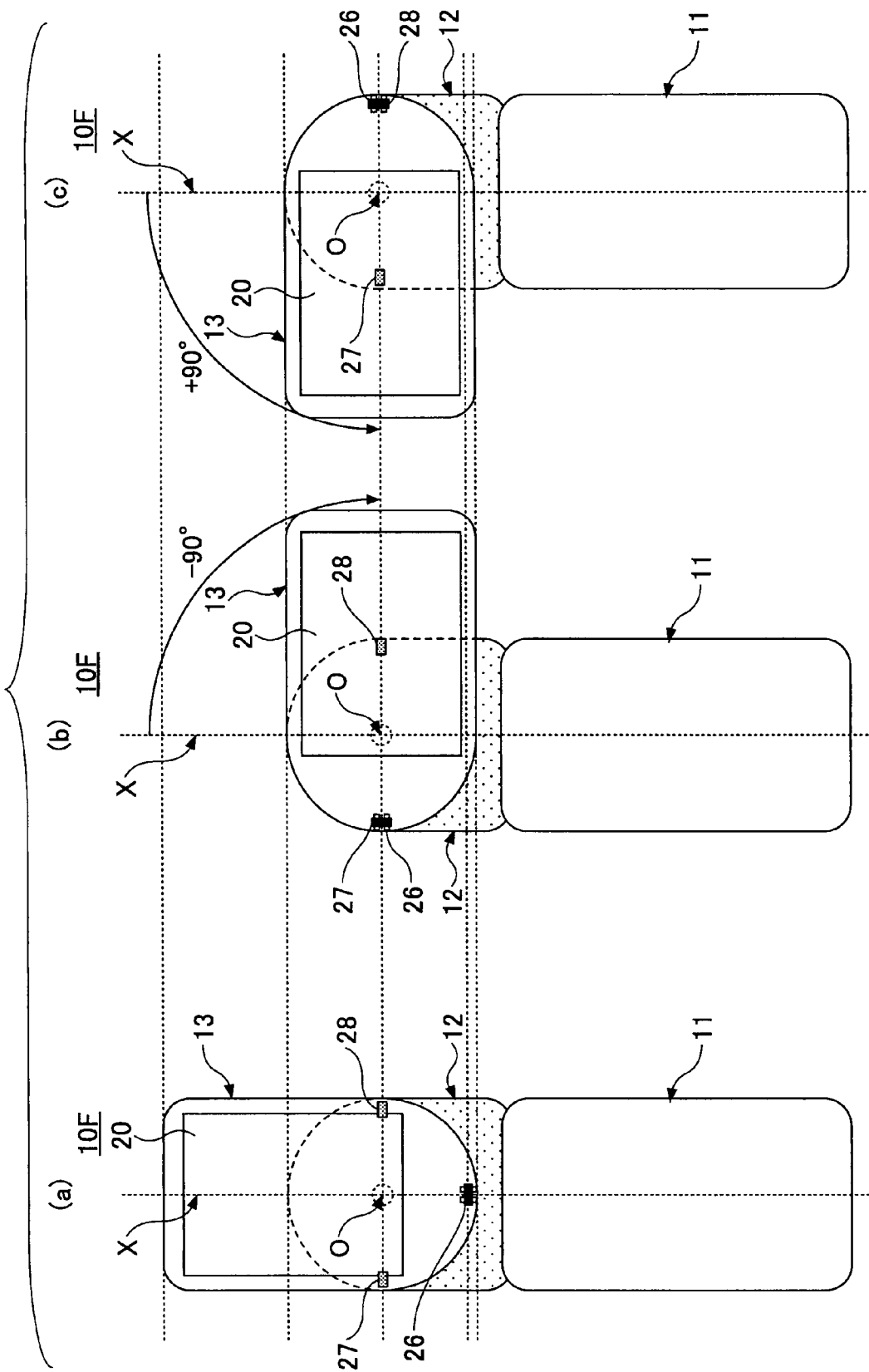
FIG. 12 is a diagram for illustrating an operation of the cellular phone according to the sixth embodiment of the present invention, in which (a) shows the state where the movable part is at the rotation center position, (b) shows the state where the movable part is rotated −90°, and (c) shows the state where the movable part is rotated +90°.

Next, a description is given of the sixth embodiment of the present invention. FIGS. 11 and 12 are diagrams showing a cellular phone 10F according to the sixth embodiment. According to the cellular phone 10F, the position detection part includes a single photoelectric sensor 26, first and second reflectors 27 and 28 such as reflecting plates, and the position calculation unit 19.

The magnetic sensors 15, 16, and 25 used in the above-described embodiments are configured to switch output signals in response to application of a magnetic field. On the other hand, the photoelectric sensor 26 used in this embodiment is configured to emit light onto the first and second reflectors 27 and 28, receive the light reflected back therefrom, and generate a signal based on the characteristic of the received light. Referring to FIG. 11, the photoelectric sensor 26 is positioned below the rotation center O on the rotation center position line X in the movable part 13 with the movable part 13 being at the rotation center position (in Detection State A).

The first and second reflectors 27 and 28 have different reflection properties from each other. Specifically, the first reflector 27 and the second reflector 28 are configured to be different in reflectance. Accordingly, even when light of the same intensity is emitted onto the first and second reflectors 27 and 28, the reflected light from the first reflector 27 and the reflected light from the second reflector 28 are different in light intensity. Further, the photoelectric sensor 26 is capable of detecting this difference in light intensity. When the photoelectric sensor 26 opposes the first reflector 27, the photoelectric sensor 26 generates a first signal. When the photoelectric sensor 26 opposes the second reflector 28, the photoelectric sensor 26 generates a second signal different from the first signal.

The first and second reflectors 27 and 28 are fixed to the arm part 12. The first reflector 27 is disposed at the position of +90° from the rotation center position line X, and the second reflector 28 is disposed at the position of −90° from the rotation center position line X. Accordingly, the first and second reflectors 27 and 28 are disposed symmetrically with respect to the rotation center position line X so as to be 180° apart from each other around the rotation center O.

The photoelectric sensor 26 is connected to the position calculation unit 19. This position calculation unit 19 figures out the position of the movable part 13 based on the combination of the first and second signals transmitted from the photoelectric sensor 26.

Next, a description is given, with reference principally to FIG. 12, of the operation of detecting the position of the movable part 13 performed by the position detection part in the cellular phone 10F having the above-described configuration.

When the movable part 13 is in Detection State A shown in (a) of FIG. 12, the photoelectric sensor 26 is spaced from each of the first and second reflectors 27 and 28. Accordingly, the photoelectric sensor 26 outputs no signal in Detection State A.

Further, when the movable part 13 is rotated −90° from Detection State A to be in Detection State B as shown in (b) of FIG. 12, the photoelectric sensor 26 is opposite to the first reflector 27. Accordingly, light emitted from the photoelectric sensor 26 is reflected by the first reflector 27 in accordance with its reflectance so as to be received by the photoelectric sensor 26. Therefore, at this point, the photoelectric sensor 26 outputs the first signal.

Further, when the movable part 13 is rotated +90° from Detection State A to be in Detection State C as shown in (c) of FIG. 12, the photoelectric sensor 26 is opposite to the second reflector 28. Accordingly, light emitted from the photoelectric sensor 26 is reflected by the second reflector 28 in accordance with its reflectance so as to be received by the photoelectric sensor 26. Therefore, at this point, the photoelectric sensor 26 outputs the second signal.

As described above, in the cellular phone 10F according to this embodiment also, different signals are output from the photoelectric sensor 26 when the movable part 13 is at the respective positions of Detection States A through C. Accordingly, the position calculation unit 19 can detect the position of the movable part 13 based on the signal transmitted from the photoelectric sensor 26. Further, in this embodiment also, the number of sensors used is one, the same as in the above-described cellular phone 10E according to the fifth embodiment. Accordingly, it is possible to reduce the number of components and facilitate wiring.

Figure 13:
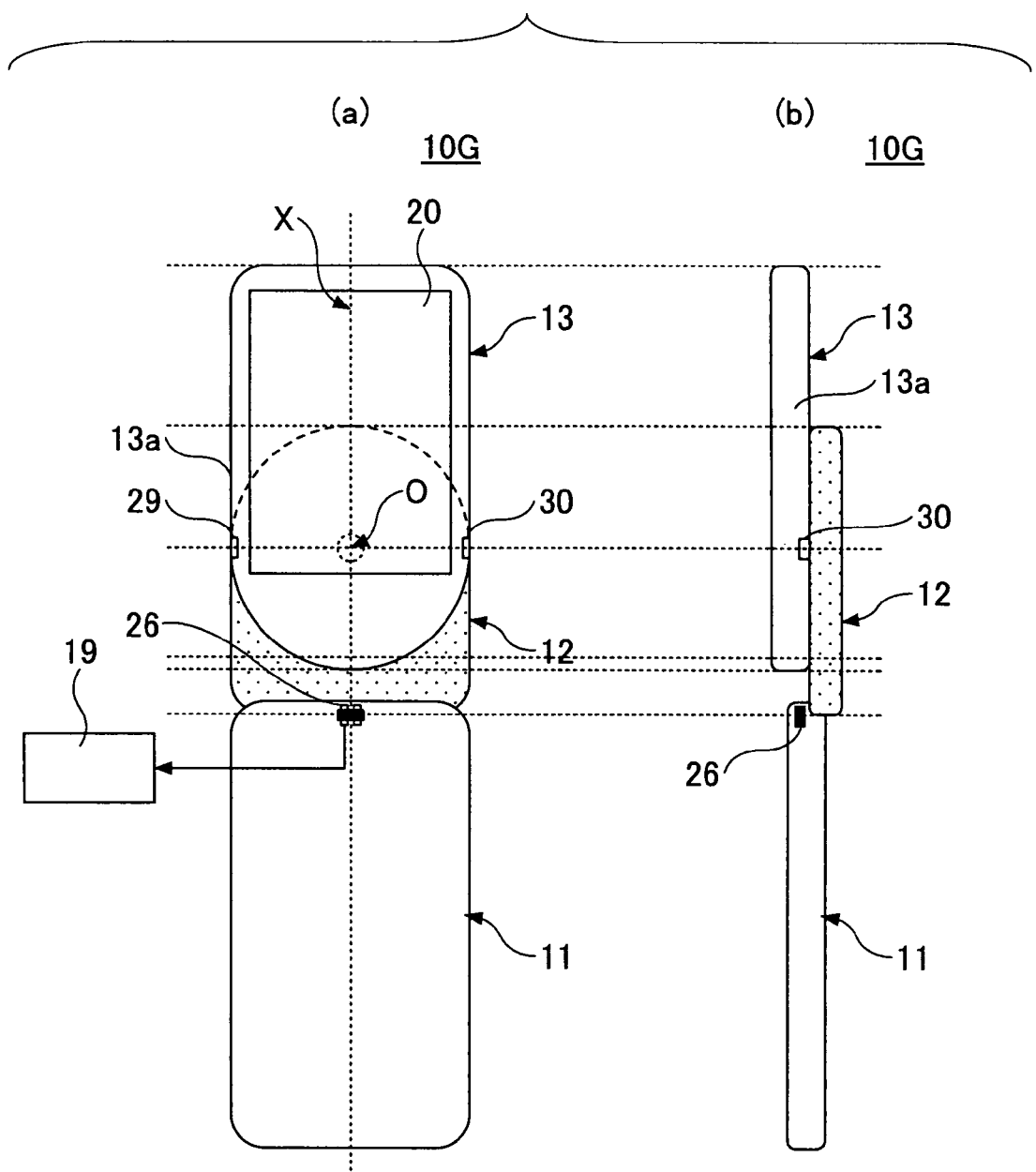
FIG. 13 is a diagram for illustrating a configuration of a cellular phone according to a seventh embodiment of the present invention, in which (a) and (b) are a front view and a right side view, respectively, of the cellular phone.
Figure 14:
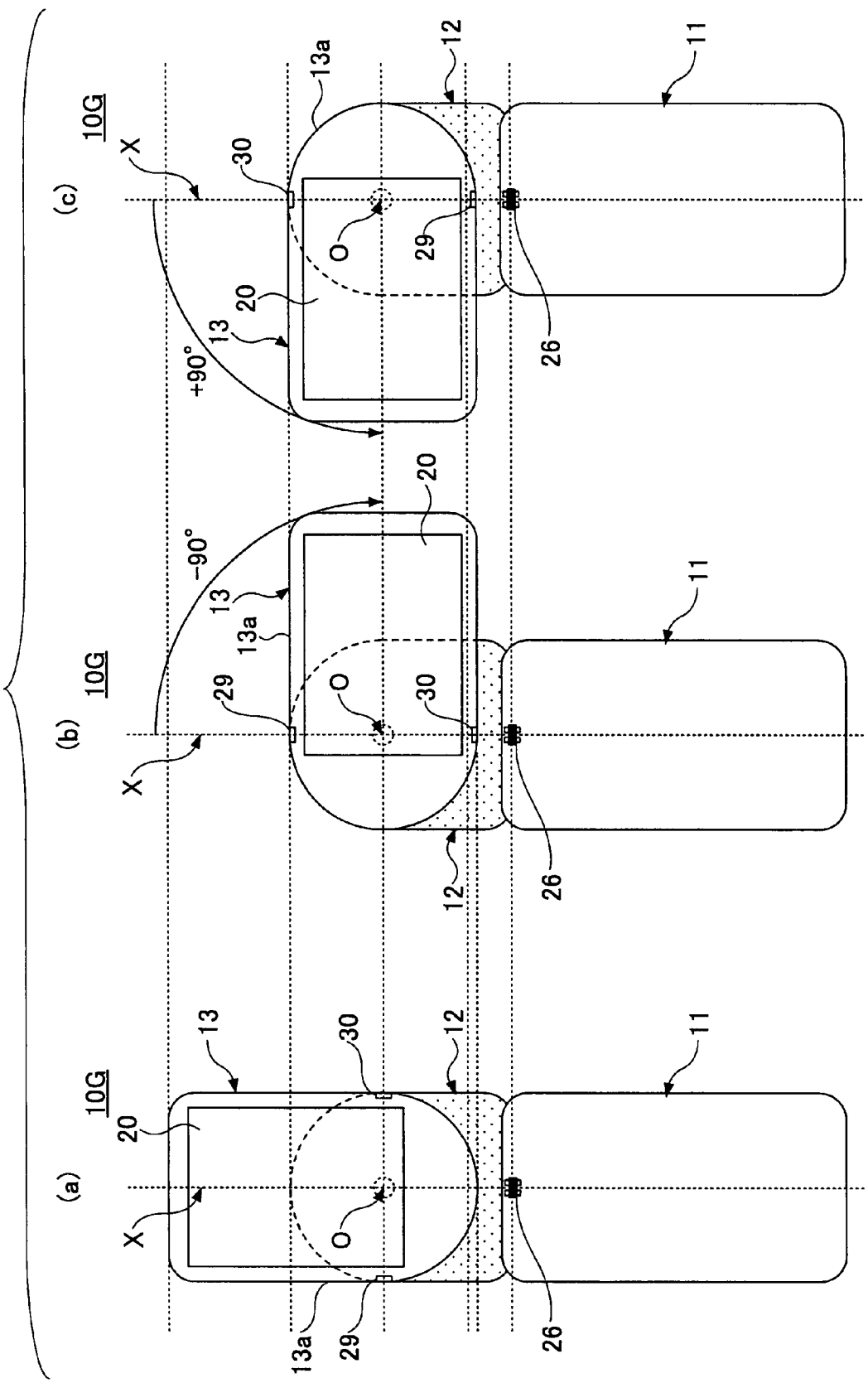
FIG. 14 is a diagram for illustrating an operation of the cellular phone according to the seventh embodiment of the present invention, in which (a) shows the state where the movable part is at the rotation center position, (b) shows the state where the movable part is rotated −90°, and (c) shows the state where the movable part is rotated +90°.

Next, a description is given of the seventh embodiment of the present invention. FIGS. 13 and 14 are diagrams showing a cellular phone 10G according to the seventh embodiment. The cellular phone 10G according to this embodiment has the same basic configuration as the cellular phone 10F according to the sixth embodiment. Accordingly, in FIGS. 13 and 14, the elements corresponding to those shown in FIGS. 11 and 12 are referred to by the same reference numerals, and a description thereof is omitted.

According to the cellular phone 10G of this embodiment, the position detection part includes the single photoelectric sensor 26, the first and second reflectors 27 and 28, and the position calculation unit 19 the same as in the above-described cellular phone 10F according to the sixth embodiment.

However, in the cellular phone 10F according to the sixth embodiment, the photoelectric sensor 26 is provided on the side of the movable part 13 opposing the arm part 12, and the reflectors 27 and 28 are provided on the side of the arm part 12 opposing the movable part 13. Meanwhile, in the cellular phone 10G according to this embodiment, the reflectors 27 and 28 are provided on corresponding exterior sides 13*a* of the movable part 13, and the photoelectric sensor 26 is provided at a position in the fixed part 11, in which position the photoelectric sensor 26 is capable of opposing each of the reflectors 27 and 28 (in accordance with the movement of the movable part 13).

According to this embodiment, providing the reflectors 27 and 28 on the corresponding exterior sides 13*a* (elongated sides perpendicular to a side on which the display part 20 is positioned) of the movable part 13 facilitates attachment of the reflectors 27 and 28 to the movable part 13. Further, since the photoelectric sensor 26 is provided in the fixed part 11, the interconnects of the photoelectric sensor 26 can be directly connected to the position calculation unit 19 inside the fixed part 11 without being passed through the hinge part 21. This further facilitates wiring.

Figure 15:
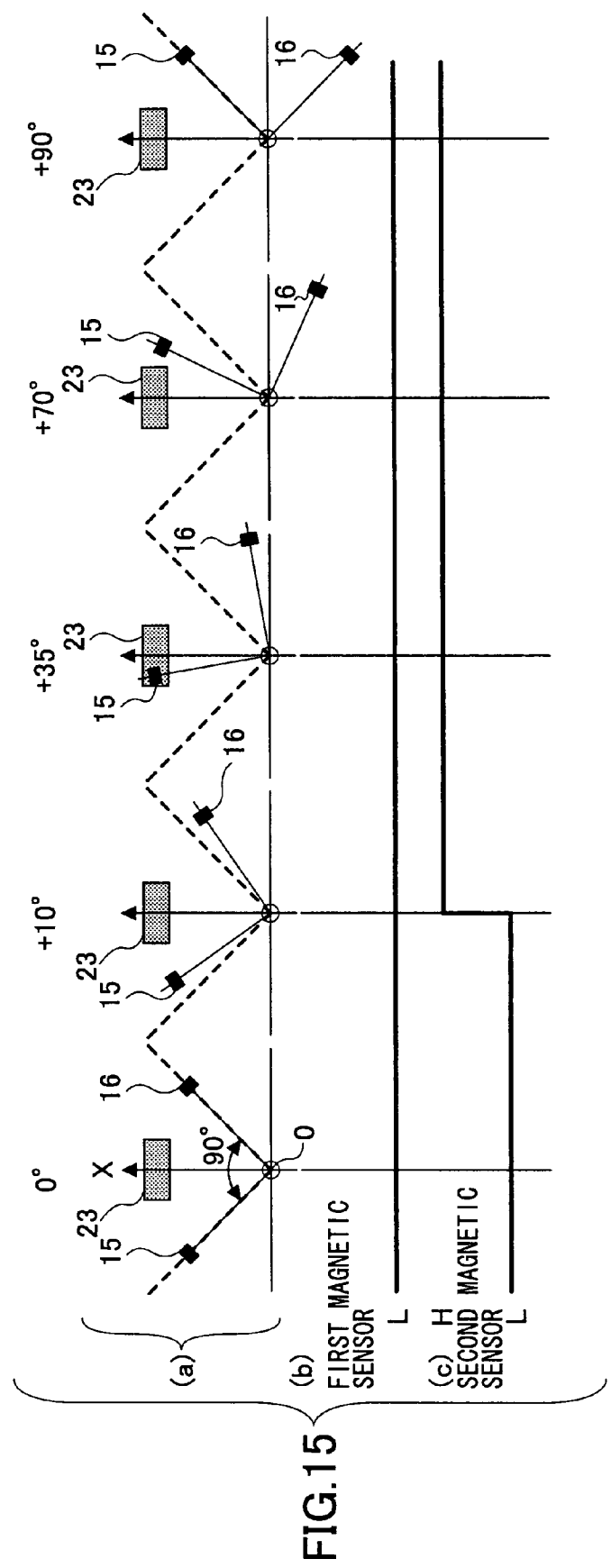
FIG. 15 is a diagram for illustrating an operation of a cellular phone according to an eighth embodiment of the present invention, in which (a) shows the status of magnets and first and second magnetic sensors, (b) is a timing chart showing the output of the first magnetic sensor in the case where the movable part is rotated 0° to +90°, and (c) is a timing chart showing the output of the second magnetic sensor in the case where the movable part is rotated 0° to +90°.
Figure 16:
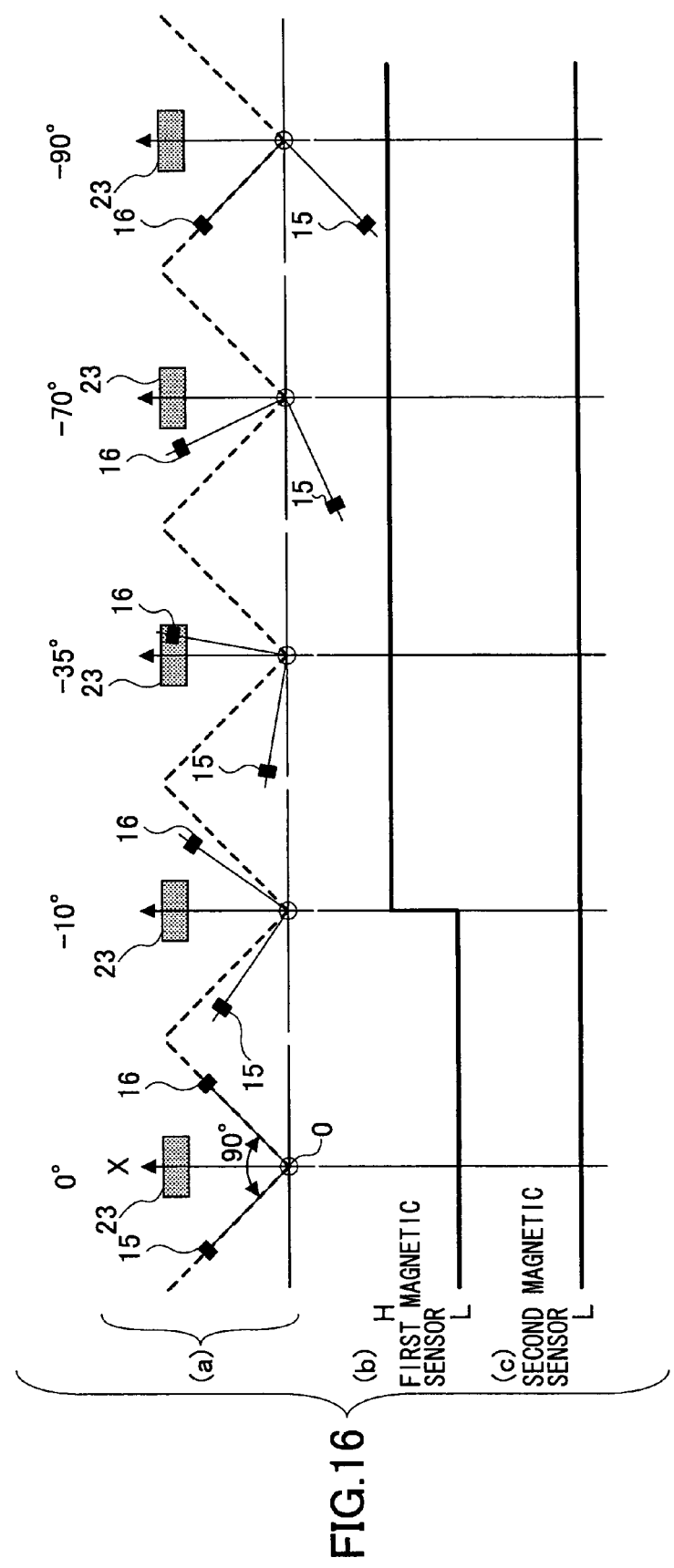
FIG. 16 is a diagram for illustrating the operation of the cellular phone according to the eighth embodiment of the present invention, in which (a) shows the status of the magnets and first and second magnetic sensors, (b) is a timing chart showing the output of the first magnetic sensor in the case where the movable part is rotated 0° to −90°, and (c) is a timing chart showing the output of the second magnetic sensor in the case where the movable part is rotated 0° to −90°.

Next, a description is given of the eighth embodiment of the present invention. FIGS. 15 and 16 are diagrams for illustrating a cellular phone according to the eighth embodiment. As described above, in the eighth through $11^{th}$ embodiments to be described below, the counterclockwise rotation of the movable part 13 around the rotation center O is referred to as a minus (−) directional rotation and the clockwise rotation of the movable part 13 around the rotation center O is referred to as a plus (+) directional rotation.

According to the cellular phone of this embodiment, a single magnet 23 is provided in the arm part 12 so as to be positioned on the rotation center position line X. Further, the first and second magnetic sensors 15 and 16 are provided in the movable part 13 so as to be positioned at the boundaries of the region over which the magnetic field of the magnet 23 extends. The magnetic field of the magnet 23 used in this embodiment extends over the range of ±45° from the rotation center position line X (the range of 90° indicated by broken lines in (a) of FIG. 15). Accordingly, with the movable part 13 being positioned in the rotation center position, the first magnetic sensor 15 is provided at the position of −45° from the rotation center position line X, and the second magnetic sensor 16 is provided at the position of +45° from the rotation center position line X.

When positioned in the region over which the magnetic field of the magnet 23 extends, that is, the range of ±45° from the rotation center position line X around the rotation center O, each of the first and second magnetic sensors 15 and 16 outputs an L signal. When leaving this range of ±45° over which the magnetic field of the magnet 23 extends as the movable part 13 moves, each of the first and second magnetic sensors 15 and 16 outputs an H signal.

Next, a description is given, with reference principally to FIGS. 15 and 16, of the operation of detecting the position of the movable part 13 performed by the position detection part in the cellular phone according to this embodiment.

FIG. 15 shows the position detection operation at the time when the movable part 13 moves from 0° (rotation center position) to +90° (Detection State B) relative to the arm part 12. When the movable part 13 is at the position of 0°, each of the first magnetic sensor 15 and the second magnetic sensor 16 is positioned within the region over which the magnetic field of the magnet 23 extends (the region of ±45° from the rotation center position line X). Therefore, each of the first magnetic sensor 15 and the second magnetic sensor 16 outputs an L signal.

When the movable part 13 rotates in the plus (clockwise) direction from the rotation center position, the second magnetic sensor 16 leaves the region over which the magnetic field of the magnet 23 extends (the region of ±45° from the rotation center position line X), but the first magnetic sensor 15 remains positioned in this region over which the magnetic field of the magnet 23 extends. Accordingly, the first magnetic sensor 15 continues to output the L signal, while the output of the second magnetic sensor 16 switches from the L signal to an H signal. While the movable part 13 is rotated to +10°, +35°, and +70°, each of the sensors 15 and 16 maintains this state as shown in FIG. 15.

When the movable part 13 is in Detection State B, the first magnetic sensor 15 is positioned at a boundary of the region over which the magnetic field of the magnet 23 extends, which boundary is on the side opposite to the boundary at which the first magnetic sensor 15 is positioned when the movable part 13 is in the position of 0°. Accordingly, in this embodiment, when the movable part 13 is in Detection State B, the first magnetic sensor 15 outputs the L signal and the second magnetic sensor 16 outputs the H signal.

FIG. 16 shows the position detection operation at the time when the movable part 13 moves from 0° (rotation center position) to −90° (Detection State C) relative to the arm part 12. As described above, when the movable part 13 is at the position of 0°, each of the first and second magnetic sensors 15 and 16 is positioned within the region over which the magnetic field of the magnet 23 extends. Therefore, each of the first and second magnetic sensors 15 and 16 outputs the L signal.

When the movable part 13 rotates in the minus (counterclockwise) direction from the rotation center position, the first magnetic sensor 15 leaves the region over which the magnetic field of the magnet 23 extends (the region of ±45° from the rotation center position line X), but the second magnetic sensor 16 remains positioned in this region over which the magnetic field of the magnet 23 extends. Accordingly, the output of the first magnetic sensor 15 switches from the L signal to an H signal, while the second magnetic sensor 16 continues to output the L signal. While the movable part 13 is rotated to −10°, −35°, and −70°, each of the sensors 15 and 16 maintains this state as shown in FIG. 16.

When the movable part 13 is in Detection State C, the second magnetic sensor 16 is positioned at a boundary of the region over which the magnetic field of the magnet 23 extends, which boundary is on the side opposite to the boundary at which the second magnetic sensor 16 is positioned when the movable part 13 is in the position of 0°. Accordingly, in this embodiment, when the movable part 13 is in Detection State C, the first magnetic sensor 15 outputs the H signal and the second magnetic sensor 16 outputs the L signal.

Figure 17:
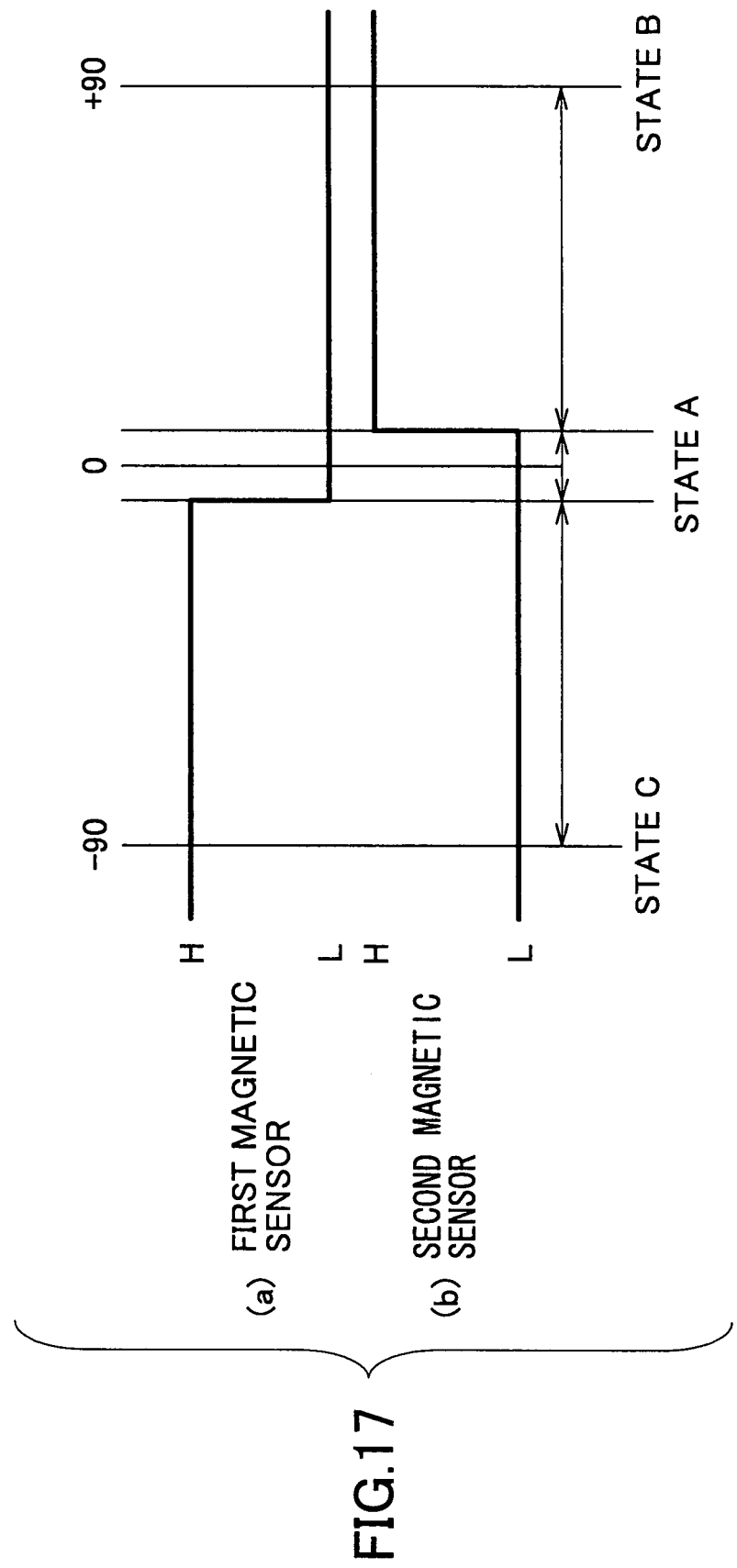
FIG. 17 is a diagram for illustrating the operation of the cellular phone according to the eighth embodiment of the present invention, in which (a) is a timing chart showing the output of the first magnetic sensor in the case where the movable part is rotated −90° to +90°, and (b) is a timing chart showing the output of the second magnetic sensor in the case where the movable part is rotated −90° to +90°.

FIGS. 17 and 18 show the relationship between the outputs of the first and second magnetic sensors 15 and 16 and Detection States A through C of the movable part 13 in this embodiment. As shown in FIGS. 17 and 18, in the cellular phone of this embodiment, it is possible to detect the three states of Detection States A through C of the movable part 13 with the two magnetic sensors 15 and 16 and the single magnet 23.

Therefore, according to the cellular phone of this embodiment also, unlike in the conventional portable terminal device, there is no need to dispose a magnetic sensor and a magnet at each of the positions corresponding to Detection States A through C, so that it is possible to reduce the number of components and the number of interconnects compared with the conventional portable terminal device. Further, since the number of magnetic sensors can be reduced compared with the conventional portable terminal device, it is possible to facilitate wiring in the hinge part 21. Further, according to this embodiment, the number of magnets used is one (only the magnet 23). This also makes it possible to reduce the number of components and lower the cost.

Figure 19:
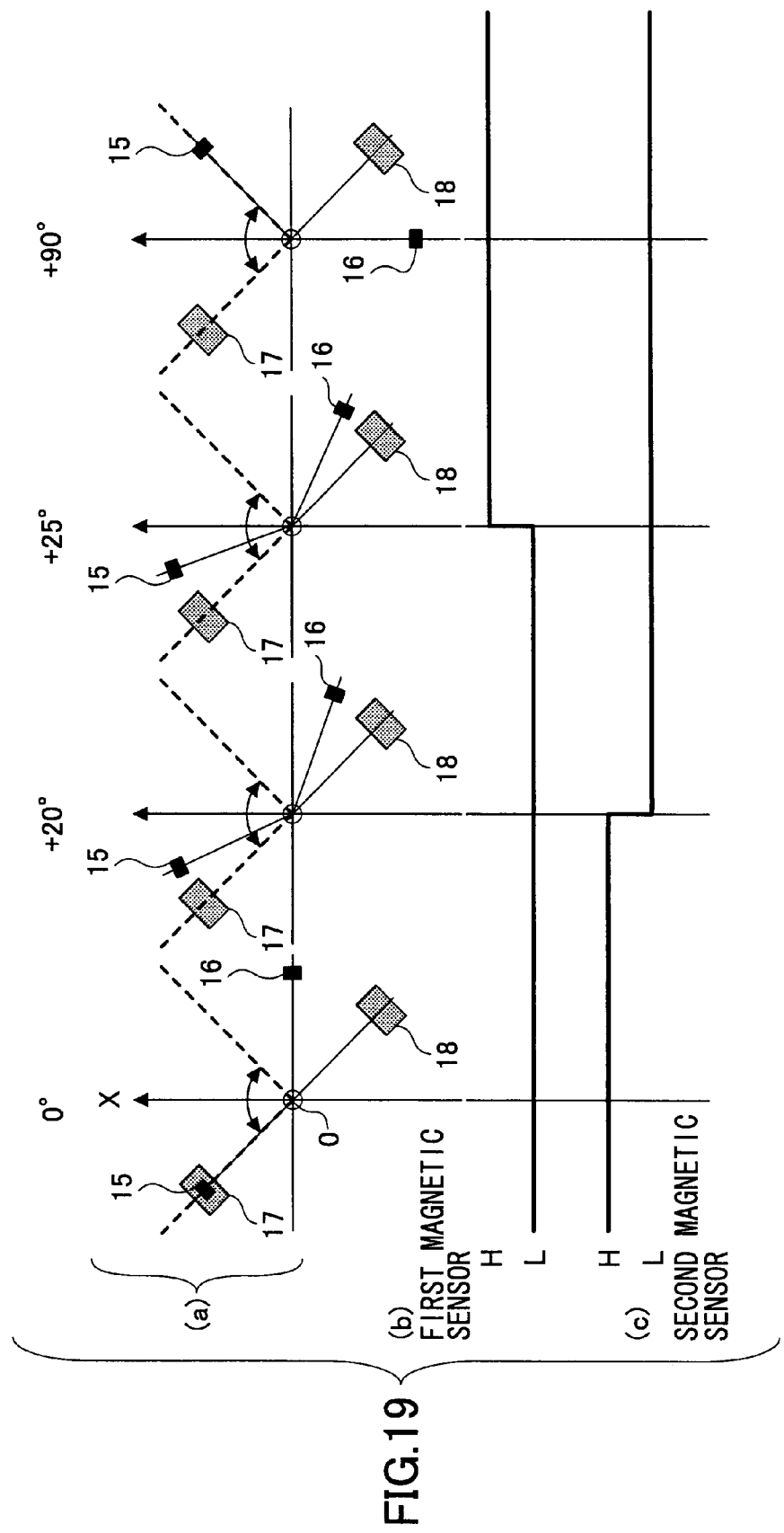
FIG. 19 is a diagram for illustrating an operation of a cellular phone according to a ninth embodiment of the present invention, in which (a) shows the status of the magnets and first and second magnetic sensors, (b) is a timing chart showing the output of the first magnetic sensor in the case where the movable part is rotated 0° to +90°, and (c) is a timing chart showing the output of the second magnetic sensor in the case where the movable part is rotated 0° to +90°.
Figure 20:
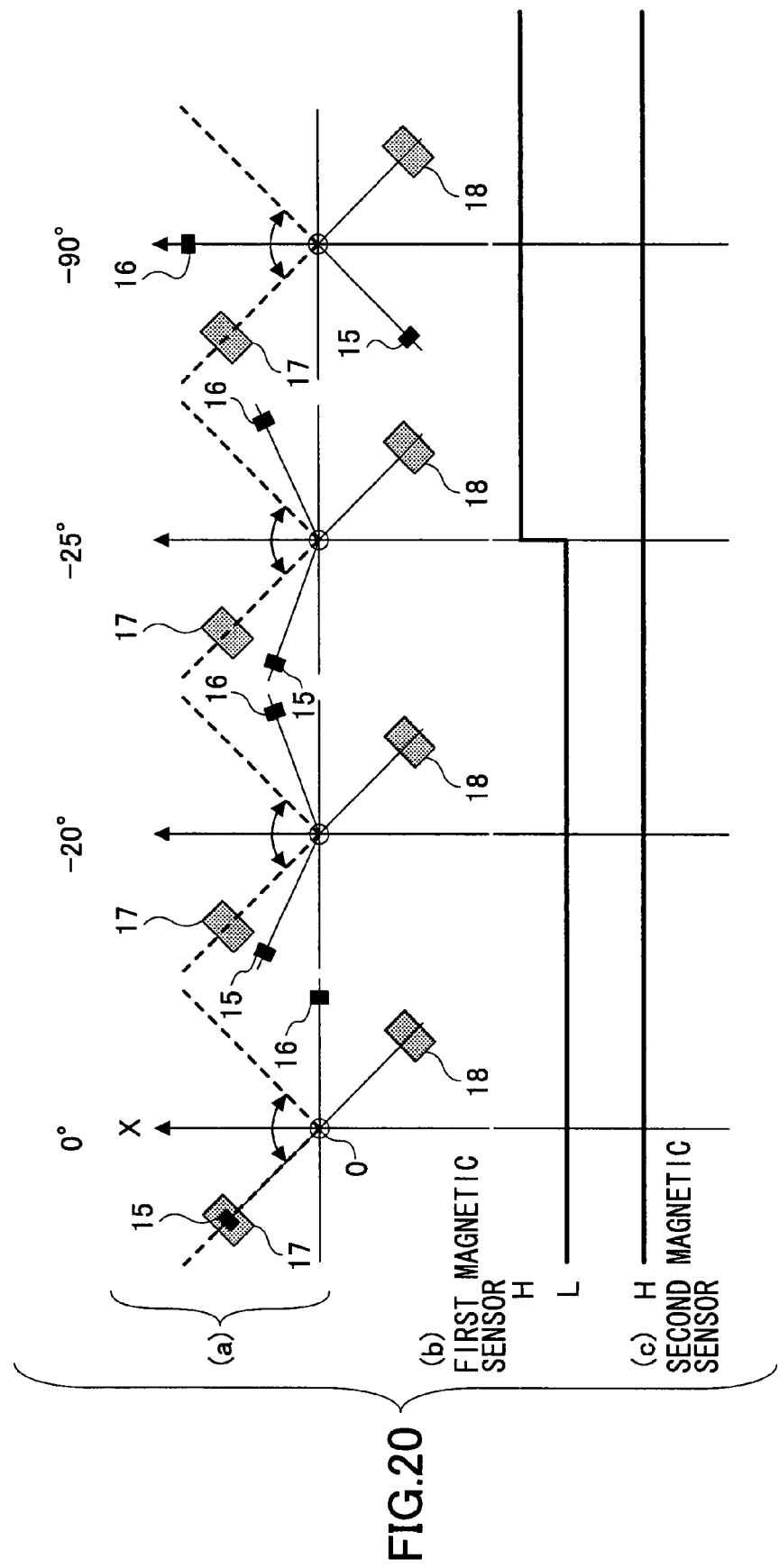
FIG. 20 is a diagram for illustrating the operation of the cellular phone according to the ninth embodiment of the present invention, in which (a) shows the status of the magnets and first and second magnetic sensors, (b) is a timing chart showing the output of the first magnetic sensor in the case where the movable part is rotated 0° to −90°, and (c) is a timing chart showing the output of the second magnetic sensor in the case where the movable part is rotated 0° to −90°.

Next, a description is given of the ninth embodiment of the present invention. FIGS. 19 and 20 are diagrams for illustrating a cellular phone according to the ninth embodiment.

According to the cellular phone of this embodiment, the first magnet 17 and the second magnet 18 are provided in the arm part 12 so as to be 180° apart from each other. Further, the first and second magnetic sensors 15 and 16 are provided so that each of the first and second magnetic sensors 15 and 16 can be positioned on a boundary of the region over which the magnetic field of the first magnet 17 or the second magnet 18 extends.

The magnetic field of the first magnet 17 extends over the range of ±20° (the range of 40° in total). Further, the magnetic field of the second magnet 18 extends over the range of −20° to +45° (the range of 65° in total). The first magnet 17 is provided at the position of −45° from the rotation center position line X around the rotation center O. Accordingly, the second magnet 18 is provided at the position of +135° from the rotation center position line X around the rotation center O.

Further, with the movable part 13 being at the rotation center position, the first magnetic sensor 15 is provided at the position of −45° from the rotation center position line X around the rotation center O, and the second magnetic sensor 16 is provided at the position of +90° from the rotation center position line X around the rotation center O. Accordingly, the first magnetic sensor 15 is opposite to the first magnet 17, and the second magnetic sensor 16 and the second magnet 18 are 45° apart from each other. As a result, the second magnetic sensor 16 is provided so as to be positioned off a boundary of the region over which the magnetic field of the second magnet 18 extends. The first magnetic sensor 15 and the second magnetic sensor 16 are provided 135° apart from each other.

Next, a description is given, with reference principally to FIGS. 19 and 20, of the operation of detecting the position of the movable part 13 performed by the position detection part in the cellular phone according to this embodiment.

FIG. 19 shows the position detection operation at the time when the movable part 13 moves from 0° (rotation center position) to +90° (Detection State B) relative to the arm part 12. When the movable part 13 is at the position of 0°, the first magnetic sensor 15 is opposite to the first magnet 17, and is positioned within the region over which the magnetic field of the first magnet 17 extends. Further, the second magnetic sensor 16 is positioned outside the region over which the magnetic field of the second magnet 18 extends (the region of +115° to +180° from the rotation center position line X). Therefore, the first magnetic sensor 15 outputs an L signal and the second magnetic sensor 16 outputs an H signal.

When the movable part 13 rotates 20° in the plus (clockwise) direction from the rotation center position, the first magnetic sensor 15 is positioned at a boundary of the region over which the magnetic field of the first magnet 17 extends (the region of −25° to −65° from the rotation center position line X), and the second magnetic sensor 16 is also positioned at a boundary of the region over which the magnetic field of the second magnet 18 extends. Accordingly, each of the first and second magnetic sensors 15 and 16 outputs the L signal.

When the movable part 13 rotates in the plus (clockwise) direction from this rotational position of +20°, the first magnetic sensor 15 leaves the region over which the magnetic field of the first magnet 17 extends, so that the output of the first magnetic sensor 15 switches to an H signal. (In FIG. 19, the position of +25° is taken as an example.) At this point, the second magnetic sensor 16 moves (rotates) so as to approach the second magnet 18, so that the second magnetic sensor 16 continues to output the L signal.

When the movable part 13 is in Detection State B, the first magnetic sensor 15 is positioned outside the region over which the magnetic field of the first magnet 17 extends, and the second magnetic sensor 16 is positioned at a boundary of the region over which the magnetic field of the second magnet 18 extends. Accordingly, the second magnetic sensor 16 outputs the L signal.

FIG. 20 shows the position detection operation at the time when the movable part 13 moves from 0° (rotation center position) to −90° (Detection State C) relative to the arm part 12. As described above, when the movable part 13 is at the position of 0°, the first magnetic sensor 15 is opposite to the first magnet 17, and the second magnetic sensor 16 is positioned outside the region over which the magnetic field of the second magnet 18 extends. Therefore, the first magnetic sensor 15 outputs the L signal and the second magnetic sensor 16 outputs the H signal.

When the movable part 13 rotates 20° in the minus (counterclockwise) direction from the rotation center position, the first magnetic sensor 15 is positioned at a boundary of the region over which the magnetic field of the first magnet 17 extends (the region of −25° to −65° from the rotation center position line X). Accordingly, the first magnetic sensor 15 outputs the L signal. Further, the second magnetic sensor 16 is outside the region over which the magnetic field of the first magnet 17 or the second magnet 18 extends. Accordingly, the second magnetic sensor 16 outputs the H signal.

When the movable part 13 rotates in the minus (counterclockwise) direction from this rotational position of −20°, the first magnetic sensor 15 leaves the region over which the magnetic field of the first magnet 17 extends, so that the output of the first magnetic sensor 15 switches to an H signal. (In FIG. 20, the position of −25° is taken as an example.) At this point, the second magnetic sensor 16 remains outside the region over which the magnetic field of the first magnet 17 or the second magnet 18 extends. Accordingly, the second magnetic sensor 16 maintains the H signal.

When the movable part 13 is in Detection State C, each of the first and second magnetic sensors 15 and 16 is positioned outside the region over which the magnetic field of the first magnet 17 or the second magnet 18 extends. Accordingly, each of the first and second magnetic sensors 15 and 16 outputs the H signal.

Figure 21:
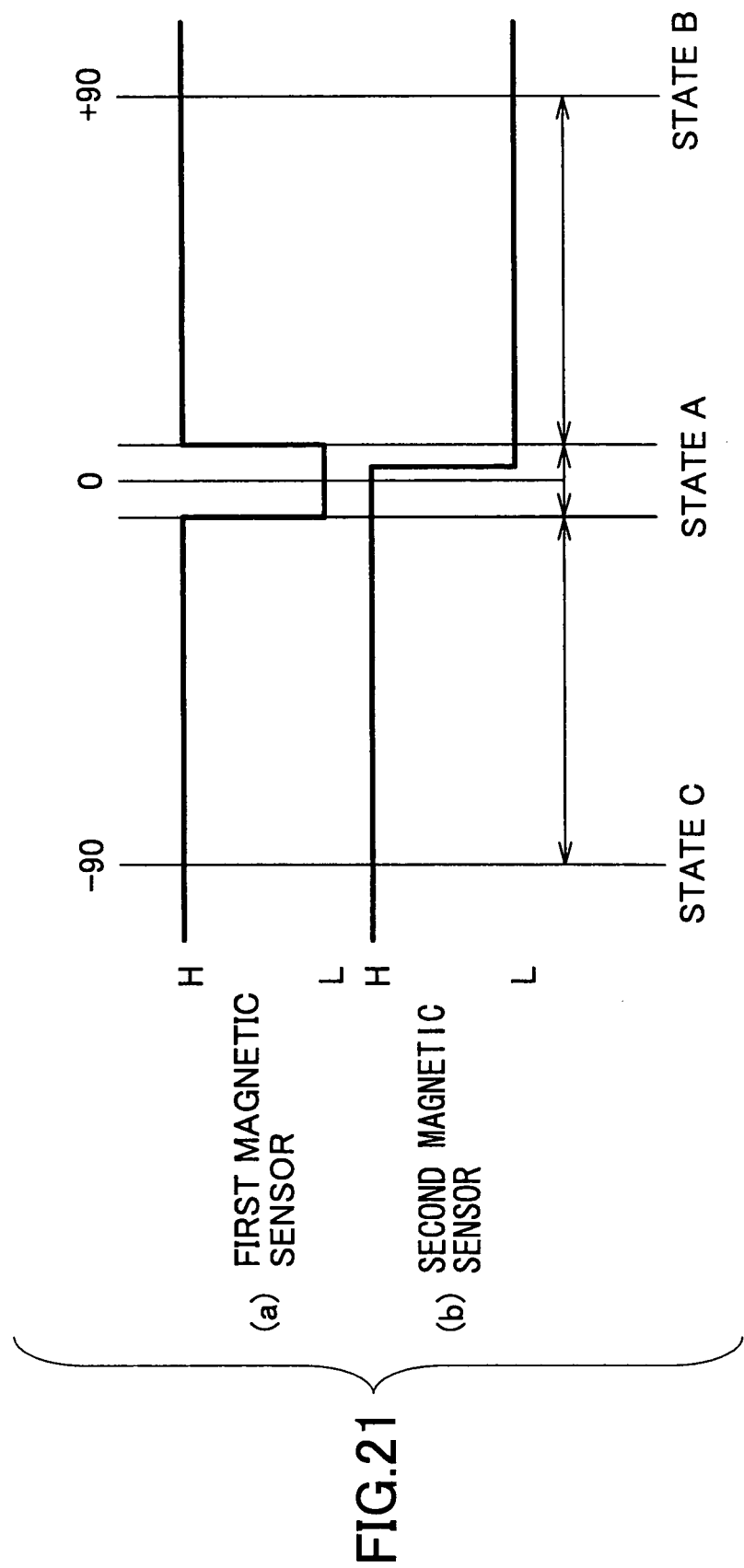
FIG. 21 is a diagram for illustrating the operation of the cellular phone according to the ninth embodiment of the present invention, in which (a) is a timing chart showing the output of the first magnetic sensor in the case where the movable part is rotated −90° to +90°, and (b) is a timing chart showing the output of the second magnetic sensor in the case where the movable part is rotated −90° to +90°.

FIGS. 21 and 22 show the relationship between the outputs of the first and second magnetic sensors 15 and 16 and Detection States A through C of the movable part 13 in this embodiment. As shown in FIGS. 21 and 22, in the cellular phone of this embodiment, it is possible to detect the three states of Detection States A through C of the movable part 13 with the two magnetic sensors 15 and 16 and the two magnets 17 and 18.

Therefore, according to the cellular phone of this embodiment also, unlike in the conventional portable terminal device, there is no need to dispose a magnetic sensor and a magnet at each of the positions corresponding to Detection States A through C, so that it is possible to reduce the number of components and the number of interconnects compared with the conventional portable terminal device. Further, since the number of magnetic sensors can be reduced compared with the conventional portable terminal device, it is possible to facilitate wiring in the hinge part 21.

Next, a description is given of the tenth embodiment of the present invention. FIGS. 23 through 28 are diagrams for illustrating a cellular phone according to the tenth embodiment.

According to the cellular phone 10B (FIG. 4) of the second embodiment, the first magnet 17 and the second magnet 18 are disposed in the arm part 12 so as to be 90° apart from each other symmetrically with respect to the rotation center position line X. Further, the first and second magnetic sensors 15 and 16 are provided in the movable part 13 so that the first magnetic sensor 15 opposes the first magnet 17 and the second magnetic sensor 16 opposes the second magnet 18 when the movable part 13 is at the rotation center position.

On the other hand, according to the cellular phone of this embodiment, the first and second magnetic sensors 15 and 16 are provided in the movable part 13 so as to be offset from the first and second magnets 17 and 18, respectively. As a result, with the movable part 13 being at the rotation center position, the first magnetic sensor 15 and the first magnet 17 are offset from each other, and the second magnetic sensor 16 and the second magnet 18 are offset from each other.

Figure 23:
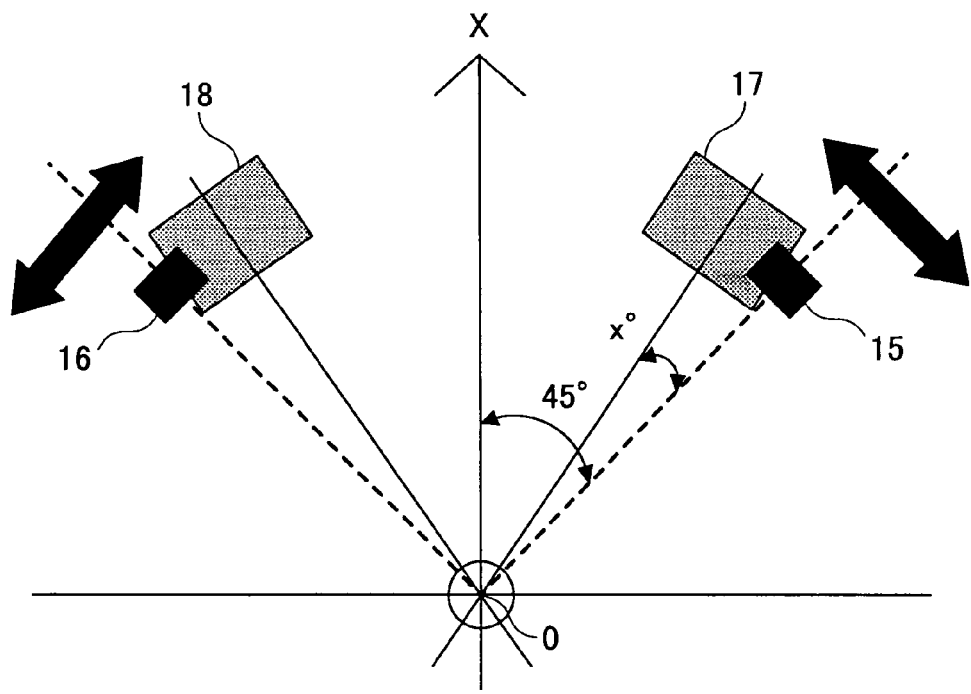
FIG. 23 is a diagram for illustrating a configuration of a cellular phone according to a tenth embodiment of the present invention, showing the state where the movable part is at the rotation center position.
Figure 24:
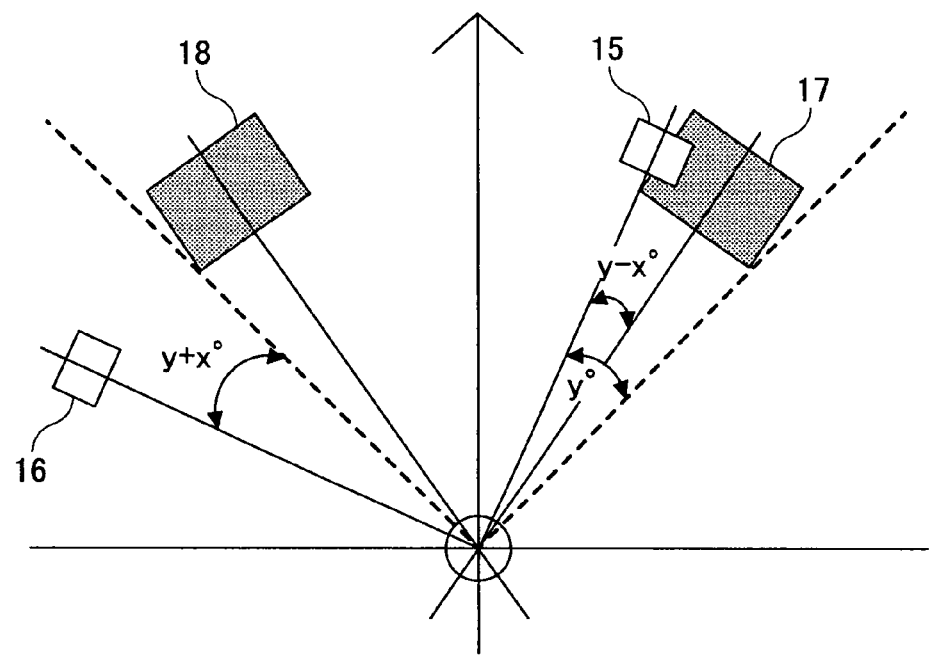
FIG. 24 is a diagram for illustrating the configuration of the cellular phone according to the tenth embodiment of the present invention, showing the state where the movable part is rotated −y° from the rotation center position.

FIG. 23 is a diagram showing the positional relationship between the magnetic sensors 15 and 16 and the magnets 17 and 18 when the movable part 13 is at the rotation center position according to this embodiment. In the case shown in FIG. 23, the first magnetic sensor 15 is offset x° in the plus (clockwise) direction with respect to the first magnet 17, and the second magnetic sensor 16 is offset x° in the minus (counterclockwise) direction with respect to the second magnet 18. As a result, for example, if the movable part 13 rotates y° in the minus (counterclockwise) direction as shown in FIG. 24, the first magnetic sensor 15 is positioned (y−x)° from the first magnet 17 in the minus direction, and the second magnetic sensor 16 is positioned (y+x)° from the second magnet 18 in the minus direction. The first magnetic sensor 15 and the second magnetic sensor 16 are 90° apart from each other around the rotation center O.

By offsetting the magnetic sensors 15 and 16 from the magnets 17 and 18, respectively, as in this embodiment, it is possible to eliminate the effects of variations unique to the magnetic sensors 15 and 16 and the magnets 17 and 18 and manufacturing errors such as the attachment errors of the magnetic sensors 15 and 16 and the magnets 17 and 18. A description is given below of the reason for this.

FIGS. 25A through 25C are timing charts for illustrating, for convenience of description, variations caused in a magnetic sensor among those caused in the cellular phone. Further, a description is given, taking the above-described cellular phone 10B of the second embodiment (FIG. 4) as an example.

The timing chart of FIG. 25A shows the ideal outputs of the magnetic sensors 15 and 16 where there are no variations in the first magnetic sensor 15 and the second magnetic sensor 16. As shown in FIG. 25A, the rising edges of the first magnetic sensor 15 from an L signal to an H signal and the rising edges of the second magnetic sensor 15 from an L signal to an H signal around the rotation center position line X (0°) coincide with each other with high accuracy. Accordingly, there is no late or delayed detection in detecting the state of the movable part.

On the other hand, each of the timing charts of FIGS. 25B and 25C shows the outputs of the magnetic sensors 15 and 16 where there is a variation in at least one of the first magnetic sensor 15 and the second magnetic sensor 16. In the following, for convenience of description, it is assumed that there is no variation in the first magnetic sensor 15 and there is a variation in only the second magnetic sensor 16.

FIG. 25B shows the case where the second magnetic sensor 16 outputs an H signal with the timing of switching from an L signal to the H signal being shifted inward (advanced) with respect to the appropriate state shown in FIG. 25A because of a variation unique to the second magnetic sensor 16 or the attachment error thereof. (The variation or attachment error in the case where the output is shifted inward [advanced] is referred to as "first variation.") Further, FIG. 25C shows the case where the second magnetic sensor 16 outputs an H signal with the timing of switching from an L signal to the H signal being shifted outward (delayed) with respect to the appropriate state shown in FIG. 25A because of a variation unique to the second magnetic sensor 16 or the attachment error thereof. (The variation or attachment error in the case where the output is shifted outward [delayed] is referred to as "second variation.")

If the output of the second magnetic sensor 16 becomes abnormal because of this first or second variation, this results in, for example, in the case of FIG. 25B, an output state indicated by arrow E1, which is not expected by the position calculation unit 19. In this situation (state E1), the output of the first magnetic sensor 15 is an L signal and the output of the second magnetic sensor 16 is an H signal. Thus, in this state E1, the outputs are the same as in Detection State B, where the movable part 13 is rotated −90°.

The control program of the position calculation unit 19 is designed on the assumption that the outputs of the first magnetic sensor 15 and the second magnetic sensor 16 simultaneously switch from an L signal to an H signal when the movable part 13 rotates in a plus or minus direction from the rotation center position. Accordingly, if the situation (state E1) shown in FIG. 25B occurs, the position calculation unit 19 is prevented from performing an appropriate position detection operation, and may wrongly determine that the movable part 13 is in Detection State B although the movable part 13 is not in Detection State B.

The same applies to the case of FIG. 25C. If the second variation exists, this results in an output state indicated by arrow E2 in FIG. 25C, which is not expected by the position calculation unit 19. In this situation (state E2), the output of the first magnetic sensor 15 is an H signal and the output of the second magnetic sensor 16 is an L signal. Thus, in this state E2, the outputs are the same as in Detection State C, where the movable part 13 is rotated +90°.

As described above, the control program of the position calculation unit 19 is designed on the assumption that the outputs of the first magnetic sensor 15 and the second magnetic sensor 16 simultaneously switch from an L signal to an H signal when the movable part 13 rotates in a plus or minus direction from the rotation center position. Accordingly, if the situation (state E2) shown in FIG. 25C occurs, the position calculation unit 19 is prevented from performing an appropriate position detection operation, and may wrongly determine that the movable part 13 is in Detection State C although the movable part 13 is not in Detection State C.

Such wrong determinations can be avoided by providing the first and second magnetic sensors 15 and 16 in the movable part 13 with offsets from the first and second magnets 17 and 18, respectively, as in this embodiment. The offsets between the first and second magnets 17 and 18 and the first and second magnetic sensors 15 and 16 (x° shown in FIG. 23) are determined based on variations such as variations in the regions over which the magnetic fields of the first and second magnets 17 and 18 extend, variations in the detection ranges of the first and second magnetic sensors 15 and 16, and the attachment errors of the first and second magnets 17 and 18 and the first and second magnetic sensors 15 and 16.

A description is given of this offset of x° using the case shown in FIGS. 25A through 25C. The x° offset is determined so as to be greater than the angle corresponding to the range of the shift (state) E1 shown in FIG. 25B and the angle corresponding to the range of the shift (state) E2 shown in FIG. 25C. The angles corresponding to the range of the shift (state) E1 and the range of the shift (state) E2 may be determined from the error ranges indicated in the specifications of the magnets 17 and 18 and the magnetic sensors 15 and 16 or by conducting an experiment for determining an error range on the magnets 17 and 18 and the magnetic sensors 15 and 16.

Figure 26:
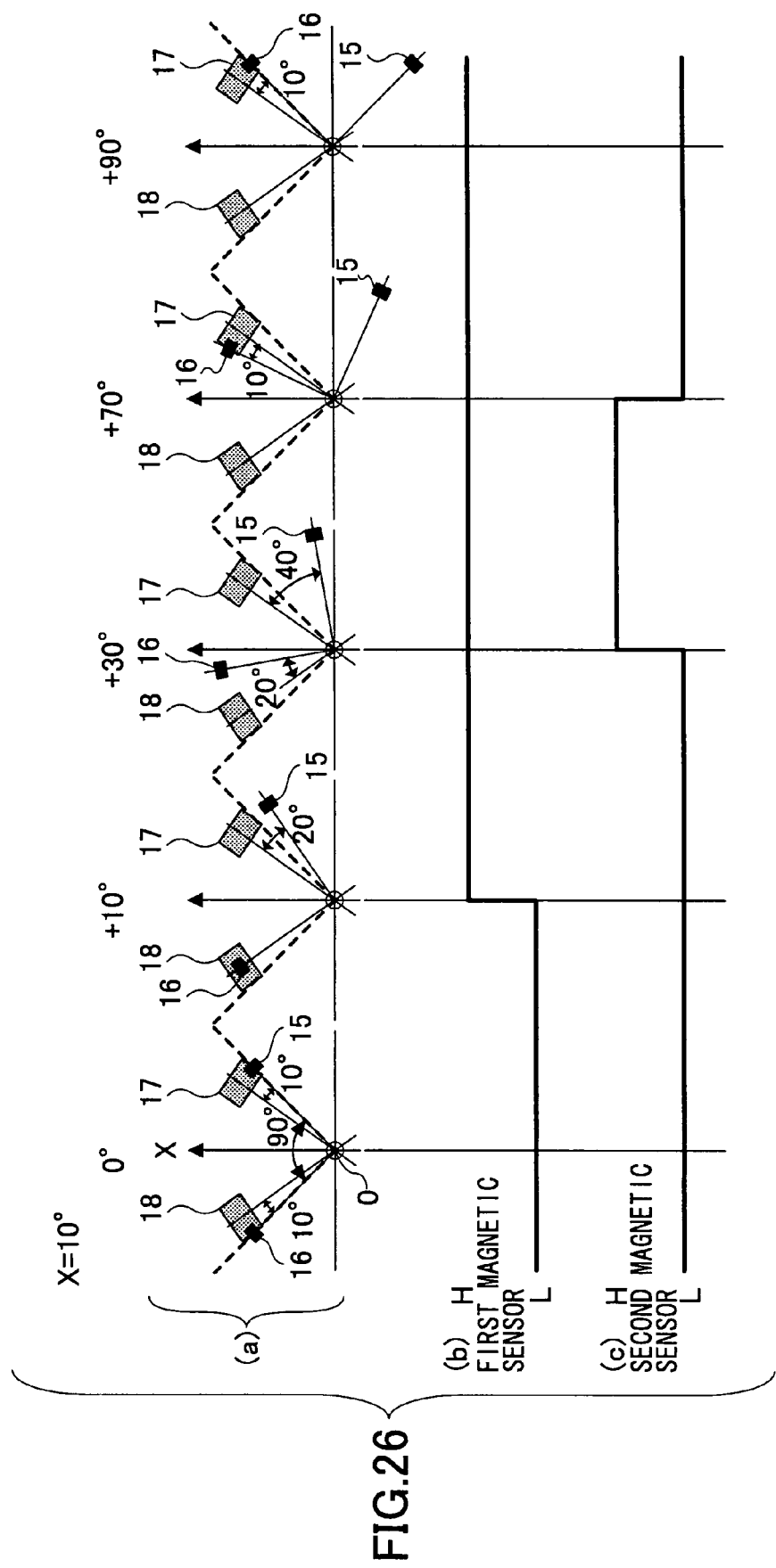
FIG. 26 is a diagram for illustrating an operation of the cellular phone according to the tenth embodiment of the present invention, in which (a) shows the status of the magnets and first and second magnetic sensors, (b) is a timing chart showing the output of the first magnetic sensor in the case where the movable part is rotated 0° to +90°, and (c) is a timing chart showing the output of the second magnetic sensor in the case where the movable part is rotated 0° to +90°.

Next, a description is given, with reference principally to FIGS. 26 and 17, of the operation of detecting the position of the movable part 13 performed by the position detection part in the cellular phone according to this embodiment. In the case shown in FIGS. 26 and 27, the offset is 10° (x°=10°).

FIG. 26 shows the position detection operation at the time when the movable part 13 moves from 0° (rotation center position) to +90° (Detection State B) relative to the arm part 12. When the movable part 13 is at the position of 0°, the first magnetic sensor 15 is positioned within the region over which the magnetic field of the first magnet 17 extends. Further, the second magnetic sensor 16 is positioned within the region over which the magnetic field of the second magnet 18 extends. Therefore, each of the first magnetic sensor 15 and the second magnetic sensor 16 outputs an L signal.

When the movable part 13 rotates 10° in the plus (clockwise) direction from the rotation center position, the first magnetic sensor 15 leaves the region over which the magnetic field of the first magnet 17 extends, but the second magnetic sensor 16 remains positioned in the region over which the magnetic field of the second magnet 18 extends. Accordingly, the output of the first magnetic sensor 15 switches from the L signal to an H signal, while the second magnetic sensor 16 continues to output the L signal.

When the movable part 13 rotates 30° in the plus (clockwise) direction from the rotation center position, the first magnetic sensor 15 remains out of the region over which the magnetic field of the first magnet 17 extends, and the second magnetic sensor 16 leaves the region over which the magnetic field of the second magnet 18 extends. Accordingly, the first magnetic sensor 15 continues to output the H signal, while the output of the second magnetic sensor 16 switches from the L signal to an H signal.

When the movable part 13 rotates 70° in the plus (clockwise) direction from the rotation center position, the first magnetic sensor 15 remains out of the region over which the magnetic field of the first magnet 17 extends, while the second magnetic sensor 16 enters the region over which the magnetic field of the first magnet 17 extends. Accordingly, the first magnetic sensor 15 continues to output the H signal, while the output of the second magnetic sensor 16 switches from the H signal to an L signal.

Further, when the movable part 13 rotates 90° in the plus (clockwise) direction from the rotation center position, the first magnetic sensor 15 remains out of the region over which the magnetic field of the first magnet 17 extends, and the second magnetic sensor 16 remains positioned in the region over which the magnetic field of the first magnet 17 extends. Accordingly, the first magnetic sensor 15 continues to output the H signal, and the second magnetic sensor 16 continues to output the L signal.

Figure 27:
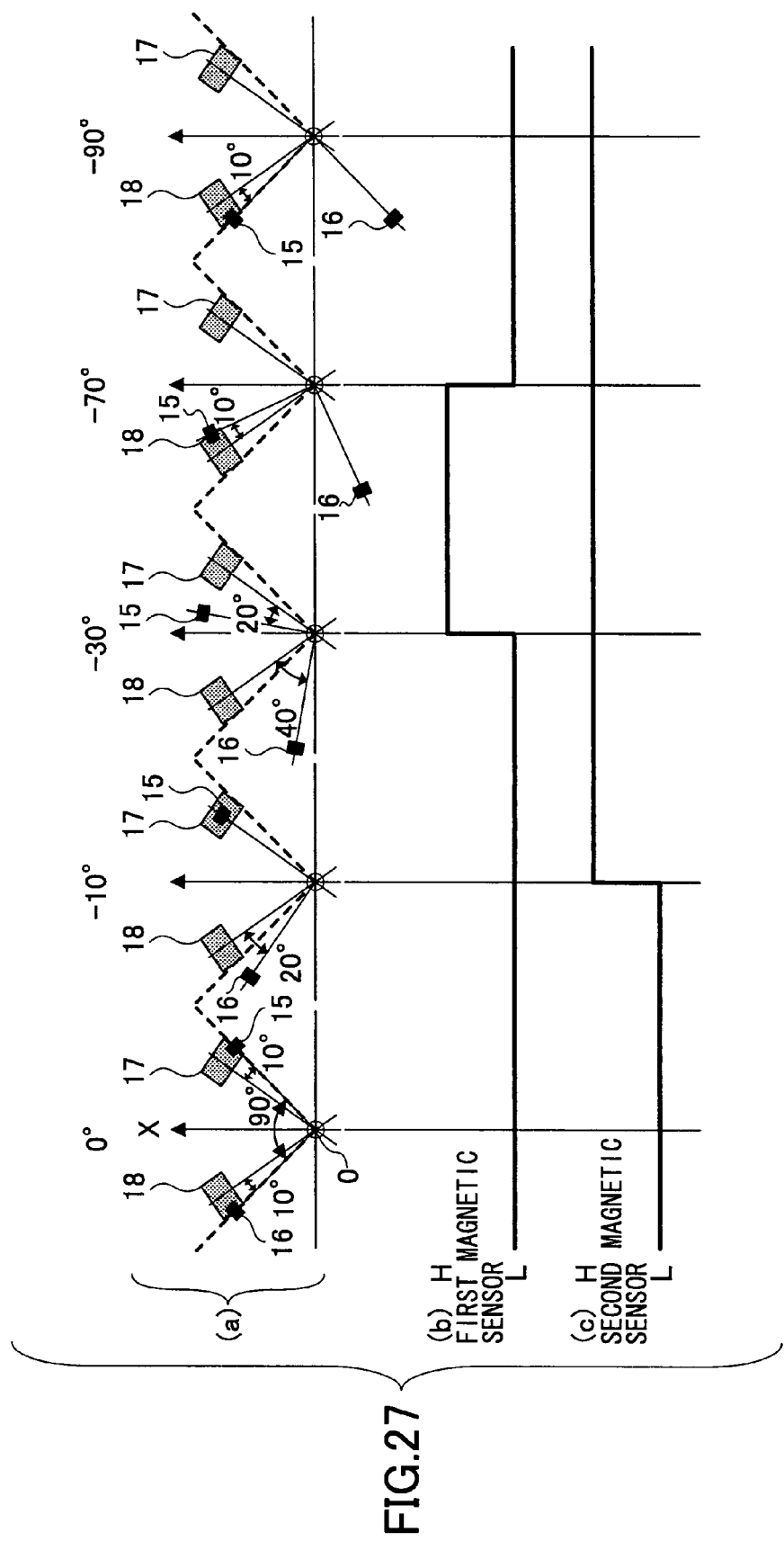
FIG. 27 is a diagram for illustrating the operation of the cellular phone according to the tenth embodiment of the present invention, in which (a) shows the status of the magnets and first and second magnetic sensors, (b) is a timing chart showing the output of the first magnetic sensor in the case where the movable part is rotated 0° to −90°, and (c) is a timing chart showing the output of the second magnetic sensor in the case where the movable part is rotated 0° to −90°.

FIG. 27 shows the position detection operation at the time when the movable part 13 moves from 0° (rotation center position) to −90° (Detection State C) relative to the arm part 12. As described above, when the movable part 13 is at the position of 0°, the first magnetic sensor 15 is positioned within the region over which the magnetic field of the first magnet 17 extends, and the second magnetic sensor 16 is positioned within the region over which the magnetic field of the second magnet 18 extends. Therefore, each of the first magnetic sensor 15 and the second magnetic sensor 16 outputs an L signal.

When the movable part 13 rotates 10° in the minus (counterclockwise) direction from the rotation center position, the second magnetic sensor 16 leaves the region over which the magnetic field of the second magnet 18 extends, but the first magnetic sensor 15 remains positioned in the region over which the magnetic field of the first magnet 17 extends. Accordingly, the first magnetic sensor 15 continues to output the L signal, while the output of the second magnetic sensor 16 switches from the L signal to an H signal.

When the movable part 13 rotates 30° in the minus (counterclockwise) direction from the rotation center position, the first magnetic sensor 15 leaves the region over which the magnetic field of the first magnet 17 extends, and the second magnetic sensor 16 remains out of the region over which the magnetic field of the second magnet 18 extends. Accordingly, the output of the first magnetic sensor 15 switches from the L signal to an H signal, while the second magnetic sensor 16 continues to output the H signal.

When the movable part 13 rotates 70° in the minus (counterclockwise) direction from the rotation center position, the second magnetic sensor 16 remains out of the region over which the magnetic field of the second magnet 18 extends, while the first magnetic sensor 15 enters the region over which the magnetic field of the second magnet 18 extends. Accordingly, the output of the first magnetic sensor 15 switches from the H signal to an L signal, while the second magnetic sensor 16 continues to output the H signal.

Further, when the movable part 13 rotates 90° in the minus (counterclockwise) direction from the rotation center position, the first magnetic sensor 15 remains positioned in the region over which the magnetic field of the second magnet 18 extends, and the second magnetic sensor 16 remains out of the region over which the magnetic field of the second magnet 18 extends. Accordingly, the first magnetic sensor 15 continues to output the L signal, and the second magnetic sensor 16 continues to output the H signal.

Figure 28:
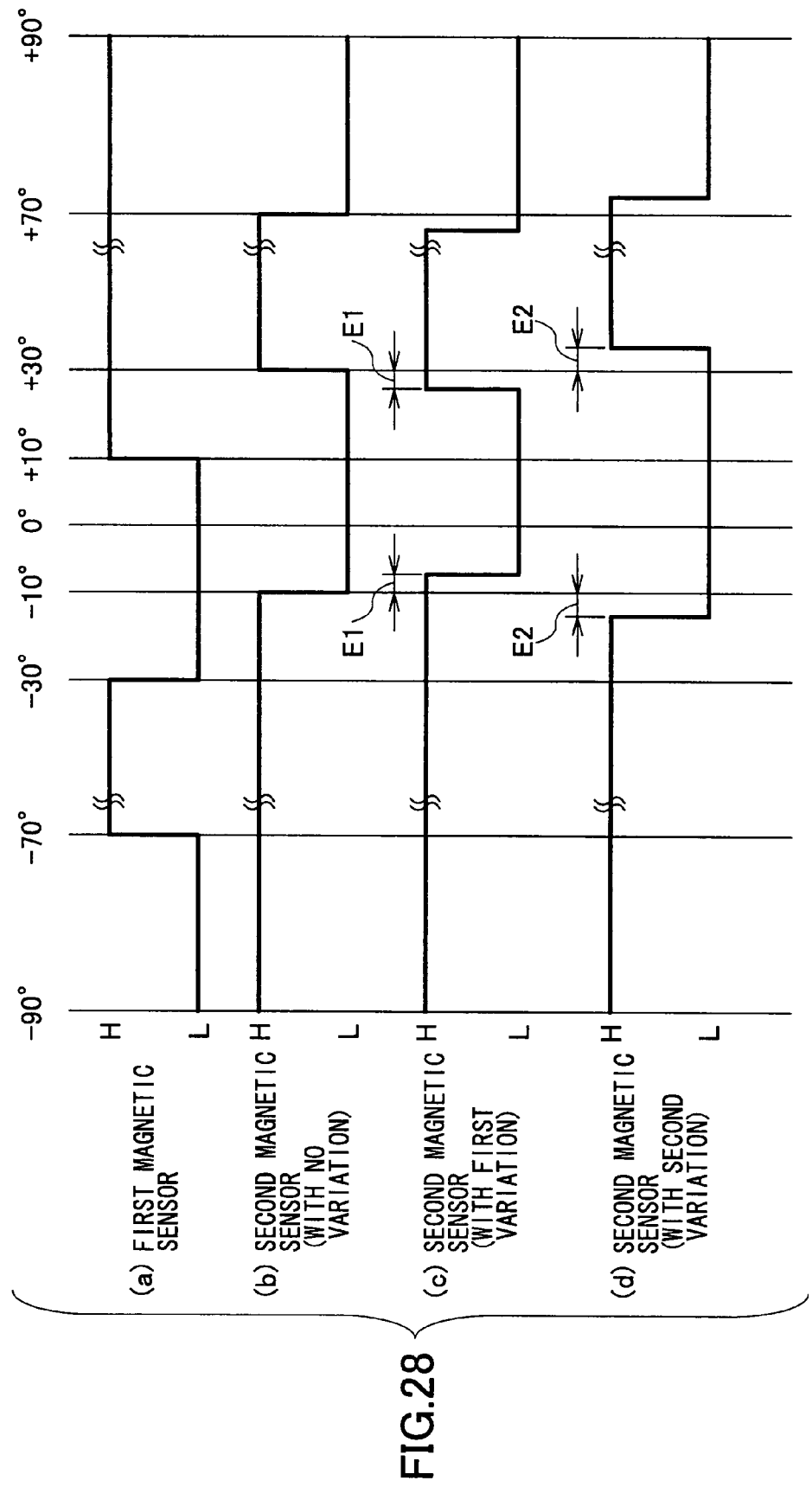
FIG. 28 is a diagram for illustrating the operation of the cellular phone according to the tenth embodiment of the present invention, in which (a) is a timing chart showing the output of the first magnetic sensor in the case where the movable part is rotated −90° to +90°, (b) is a timing chart showing the output of the second magnetic sensor (with no variation) in the case where the movable part is rotated −90° to +90°, (c) is a timing chart showing the output of the second magnetic sensor (with the first variation) in the case where the movable part is rotated −90° to +90°, and (d) is a timing chart showing the output of the second magnetic sensor (with the second variation) in the case where the movable part is rotated −90° to +90°.

Referring to FIG. 28, (a) and (b) show the relationship between the outputs of the first and second magnetic sensors 15 and 16 and Detection States A through C of the movable part 13 in this embodiment. As shown in (a) and (b) of FIG. 28, in the cellular phone of this embodiment, it is possible to detect the three states of Detection States A through C of the movable part 13 with the two magnetic sensors 15 and 16 and the two magnets 17 and 18.

Therefore, according to the cellular phone of this embodiment also, unlike in the conventional portable terminal device, there is no need to dispose a magnetic sensor and a magnet at each of the positions corresponding to Detection States A through C. Accordingly, it is possible to reduce the number of magnetic sensors compared with the conventional portable terminal device, so that it is possible to reduce the number of components and the number of interconnects, to lower the cost, and to facilitate wiring in the hinge part 21 compared with the conventional portable terminal device.

Here, a description is given of the case where there is the first or second variation, described with reference to FIGS. 25A through 25C in this embodiment, in at least one of the first and second magnetic sensors 15 and 16. In the following, for convenience of description, it is assumed that there is the first or second variation in the second magnetic sensor 16.

Referring to FIG. 28, (c) shows the case where there is the first variation in the second magnetic sensor 16. As described above with reference to FIG. 25B, when there is the first variation, the output of the second magnetic sensor 16 is reversed for the first time earlier than the appropriate state (shown in (b) of FIG. 28) by the angle indicated by arrow E1 in response to the plus or minus directional rotation of the movable part 13.

Further, referring to FIG. 28, (d) shows the case where there is the second variation in the second magnetic sensor 16. As described above with reference to FIG. 25C, when there is the second variation, the output of the second magnetic sensor 16 is reversed for the first time later than the appropriate state (shown in (b) of FIG. 28) by the angle indicated by arrow E2 in response to the plus or minus directional rotation of the movable part 13.

Thus, the first and second magnetic sensors 15 and 16 are provided in the movable part 13 so as to be offset from the first and second magnets 17 and 18, respectively. On the other hand, because of, for example, the detection errors of the magnetic sensors 15 and 16 and the attachment errors of the magnetic sensors 15 and 16 and the magnets 17 and 18, the timing of the first reversal of the output of the second magnetic sensor 16 in response to the plus or minus directional rotation of the movable part 13 may be shifted by the amount E1 or E2 compared with the appropriate state. The offsets of the magnetic sensors 15 and 16 are determined so as to be greater than the angles corresponding to the amounts E1 and E2.

A description is given of one or more effects produced by the above-described configuration. First, assuming that the movable part 13 rotates in, for example, the plus direction in the case shown in (a) and (b) of FIG. 28, where there are no variations in the first magnetic sensor 15 and the second magnetic sensor 16, the output of the first magnetic sensor 15 first switches from an L signal to an H signal (at +10° of (a) of FIG. 28), and then the output of the second magnetic sensor 16 switches from an L signal to an H signal (at +30° of (b) of FIG. 28). That the output signals of the magnetic sensors 15 and 16 are reversed in such order with the rotation of the movable part 13 is prestored in the position calculation unit 19. (In the configuration described above with reference to FIGS. 25A through 25C, simultaneous reversal of the outputs of the magnetic sensors 15 and 16 is detected.)

Accordingly, in this embodiment also, there is concern that the position of the movable part 13 may not be appropriately detected unless the output signal of the first magnetic sensor 15 is first reversed and then the output signal of the second magnetic sensor 16 is reversed in this order.

However, according to this embodiment, the offset between the first magnetic sensor 15 and the first magnet 17 and the offset between the second magnetic sensor 16 and the second magnet 18 are determined so as to be greater than the angles corresponding to the states E1 and E2 caused by, for example, the detection errors of the magnetic sensors 15 and 16 and the attachment errors of the magnetic sensors 15 and 16 and the magnets 17 and 18. Accordingly, even if the shift E1 shown in (c) of FIG. 28 or the shift E2 shown in (d) of FIG. 28 is caused by the first or second variation, the order of timing of the reversals of the output signals of the first and second magnetic sensors 15 and 16 is prevented from being reverse to the appropriate order.

Accordingly, the presence of the state (shift) E1 or E2 caused by, for example, the detection errors of the magnetic sensors 15 and 16 and the attachment errors of the magnetic sensors 15 and 16 and the magnets 17 and 18 does not cause the position calculation unit 19 to wrongly detect the position of the movable part 13. Accordingly, it is possible to detect the position of the movable part 13 with high accuracy, so that it is possible to perform appropriate displaying on the liquid crystal display part 20 provided in the movable part 13 and thus to increase the reliability of the portable terminal device.

Next, a description is given of the 11$^{th}$ embodiment of the present invention. FIGS. 29 through 33 are diagrams for illustrating a cellular phone according to the 11$^{th}$ embodiment.

In the above-described cellular phone according to the tenth embodiment (FIG. 23), the first and second magnets 17 and 18 are provided so as to be offset inward from the first and second magnetic sensors 15 and 16, respectively. On the other hand, in the cellular phone according to this embodiment, the first and second magnets 17 and 18 are provided so as to be offset outward from the first and second magnetic sensors 15 and 16, respectively. The first magnetic sensor 15 and the second magnetic sensor 16 are 90° apart from each other around the rotation center O the same as in the tenth embodiment.

Figure 29:
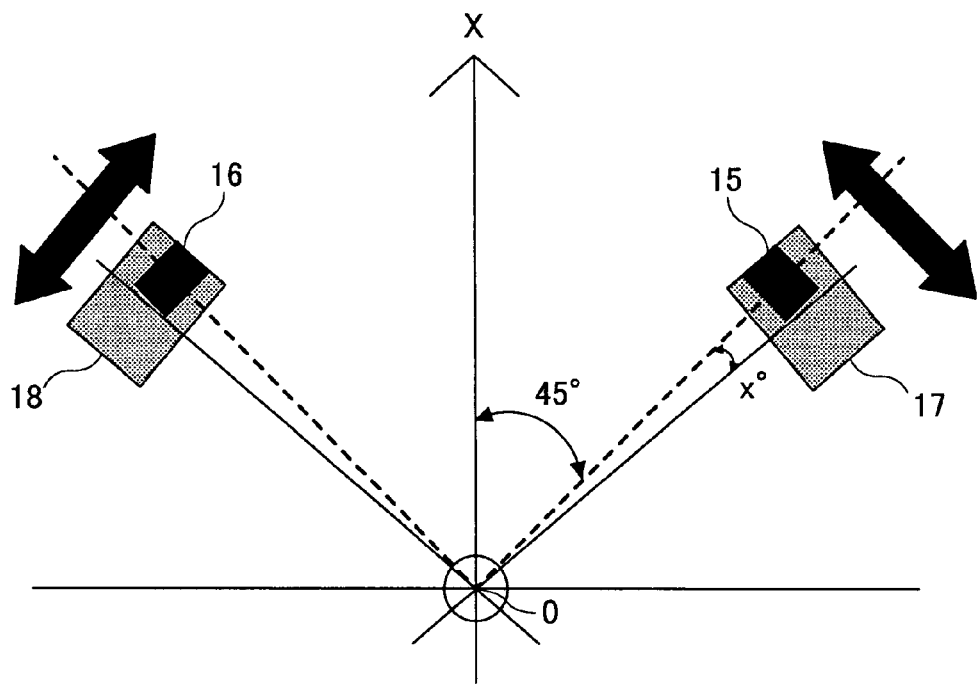
FIG. 29 is a diagram for illustrating a configuration of a cellular phone according to an 11$^{th}$ embodiment of the present invention, showing the state where the movable part is at the rotation center position.
Figure 30:
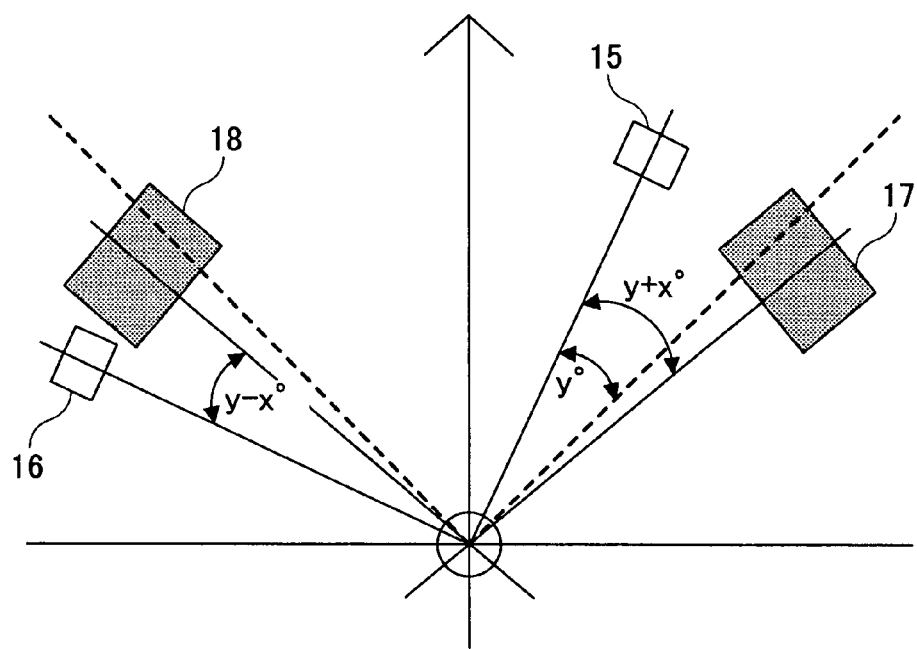
FIG. 30 is a diagram for illustrating the configuration of the cellular phone according to the 11$^{th}$ embodiment of the present invention, showing the state where the movable part is rotated −y° from the rotation center position.

FIG. 29 is a diagram showing the positional relationship between the magnetic sensors 15 and 16 and the magnets 17 and 18 when the movable part 13 is at the rotation center position according to this embodiment. In the case shown in FIG. 29, the first magnetic sensor 15 is offset x° in the minus (counterclockwise) direction with respect to the first magnet 17, and the second magnetic sensor 16 is offset x° in the plus (clockwise) direction with respect to the second magnet 18. As a result, for example, if the movable part 13 rotates y° in the minus (counterclockwise) direction as shown in FIG. 30, the first magnetic sensor 15 is positioned (y+x)° from the first magnet 17 in the minus direction, and the second magnetic sensor 16 is positioned (y−x)° from the second magnet 18 in the minus direction.

Figure 31:
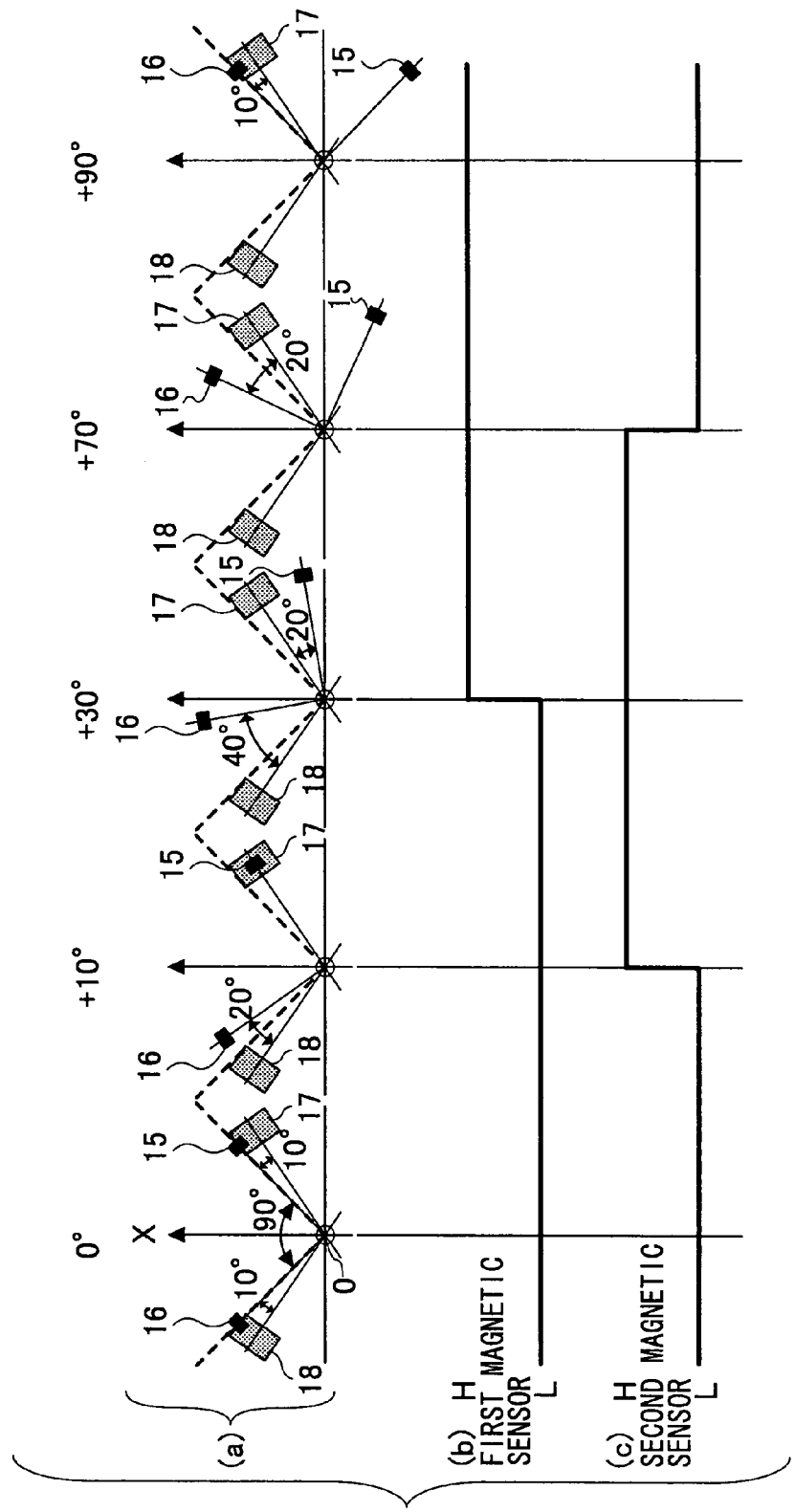
FIG. 31 is a diagram for illustrating an operation of the cellular phone according to the 11$^{th}$ embodiment of the present invention, in which (a) shows the status of the magnets and first and second magnetic sensors, (b) is a timing chart showing the output of the first magnetic sensor in the case where the movable part is rotated 0° to +90°, and (c) is a timing chart showing the output of the second magnetic sensor in the case where the movable part is rotated 0° to +90°.
Figure 32:
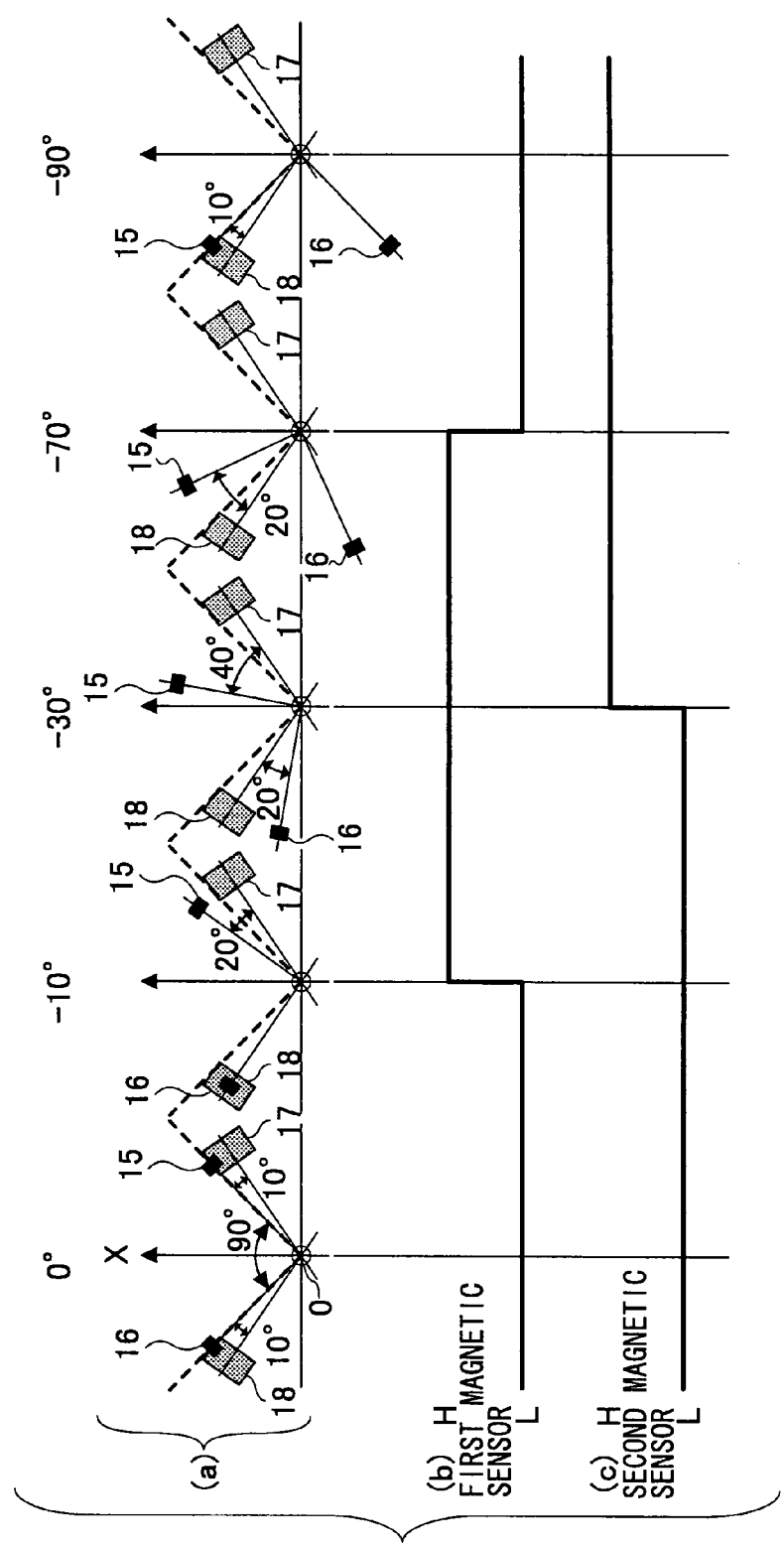
FIG. 32 is a diagram for illustrating the operation of the cellular phone according to the 11$^{th}$ embodiment of the present invention, in which (a) shows the status of the magnets and first and second magnetic sensors, (b) is a timing chart showing the output of the first magnetic sensor in the case where the movable part is rotated 0° to −90°, and (c) is a timing chart showing the output of the second magnetic sensor in the case where the movable part is rotated 0° to −90°.

Next, a description is given, with reference principally to FIGS. 31 and 32, of the operation of detecting the position of the movable part 13 performed by the position detection part in the cellular phone according to this embodiment. In the case shown in FIGS. 31 and 32, the offset is 10° (x°=10°).

FIG. 31 shows the position detection operation at the time when the movable part 13 moves from 0° (rotation center position) to +90° (Detection State B) relative to the arm part 12. When the movable part 13 is at the position of 0°, the first magnetic sensor 15 is positioned within the region over which the magnetic field of the first magnet 17 extends. Further, the second magnetic sensor 16 is positioned within the region over which the magnetic field of the second magnet 18 extends. Therefore, each of the first magnetic sensor 15 and the second magnetic sensor 16 outputs an L signal.

When the movable part 13 rotates 10° in the plus (clockwise) direction from the rotation center position, the second magnetic sensor 16 leaves the region over which the magnetic field of the second magnet 18 extends, but the first magnetic sensor 15 remains positioned in the region over which the magnetic field of the first magnet 17 extends. Accordingly, the first magnetic sensor 15 continues to output the L signal, while the output of the second magnetic sensor 16 switches from the L signal to an H signal.

When the movable part 13 rotates 30° in the plus (clockwise) direction from the rotation center position, the second magnetic sensor 16 remains out of the region over which the magnetic field of the second magnet 18 extends, and the first magnetic sensor 15 leaves the region over which the magnetic field of the first magnet 17 extends. Accordingly, the output of the first magnetic sensor 15 switches from the L signal to an H signal, while the second magnetic sensor 16 continues to output the H signal.

When the movable part 13 rotates 70° in the plus (clockwise) direction from the rotation center position, the first magnetic sensor 15 remains out of the region over which the magnetic field of the second magnet 17 extends, while the second magnetic sensor 16 enters the region over which the magnetic field of the first magnet 17 extends. Accordingly, the first magnetic sensor 15 continues to output the H signal, while the output of the second magnetic sensor 16 switches from the H signal to an L signal.

Further, when the movable part 13 rotates 90° in the plus (clockwise) direction from the rotation center position, the first magnetic sensor 15 remains out of the region over which the magnetic field of the first magnet 17 extends, and the second magnetic sensor 16 remains positioned in the region over which the magnetic field of the first magnet 17 extends. Accordingly, the first magnetic sensor 15 continues to output the H signal, and the second magnetic sensor 16 continues to output the L signal.

FIG. 32 shows the position detection operation at the time when the movable part 13 moves from 0° (rotation center position) to −90° (Detection State C) relative to the arm part 12. As described above, when the movable part 13 is at the position of 0°, the first magnetic sensor 15 is positioned within the region over which the magnetic field of the first magnet 17 extends, and the second magnetic sensor 16 is positioned within the region over which the magnetic field of the second magnet 18 extends. Therefore, each of the first magnetic sensor 15 and the second magnetic sensor 16 outputs an L signal.

When the movable part 13 rotates 10° in the minus (counterclockwise) direction from the rotation center position, the first magnetic sensor 15 leaves the region over which the magnetic field of the first magnet 17 extends, but the second magnetic sensor 16 remains positioned in the region over which the magnetic field of the second magnet 18 extends. Accordingly, the output of the first magnetic sensor 15 switches from the L signal to an H signal, while the second magnetic sensor 16 continues to output the L signal.

When the movable part 13 rotates 30° in the minus (counterclockwise) direction from the rotation center position, the second magnetic sensor 16 leaves the region over which the magnetic field of the second magnet 18 extends, and the first magnetic sensor 15 remains out of the region over which the magnetic field of the first magnet 17 extends. Accordingly, the first magnetic sensor 15 continues to output the H signal, while the output of the second magnetic sensor 16 switches from the L signal to an H signal.

When the movable part 13 rotates 70° in the minus (counterclockwise) direction from the rotation center position, the second magnetic sensor 16 remains out of the region over which the magnetic field of the second magnet 18 extends, while the first magnetic sensor 15 enters the region over which the magnetic field of the second magnet 18 extends. Accordingly, the output of the first magnetic sensor 15 switches from the H signal to an L signal, while the second magnetic sensor 16 continues to output the H signal.

Further, when the movable part 13 rotates 90° in the minus (counterclockwise) direction from the rotation center position, the first magnetic sensor 15 remains positioned in the region over which the magnetic field of the second magnet 18 extends, and the second magnetic sensor 16 remains out of the region over which the magnetic field of the second magnet 18 extends. Accordingly, the first magnetic sensor 15 continues to output the L signal, and the second magnetic sensor 16 continues to output the H signal.

Figure 33:
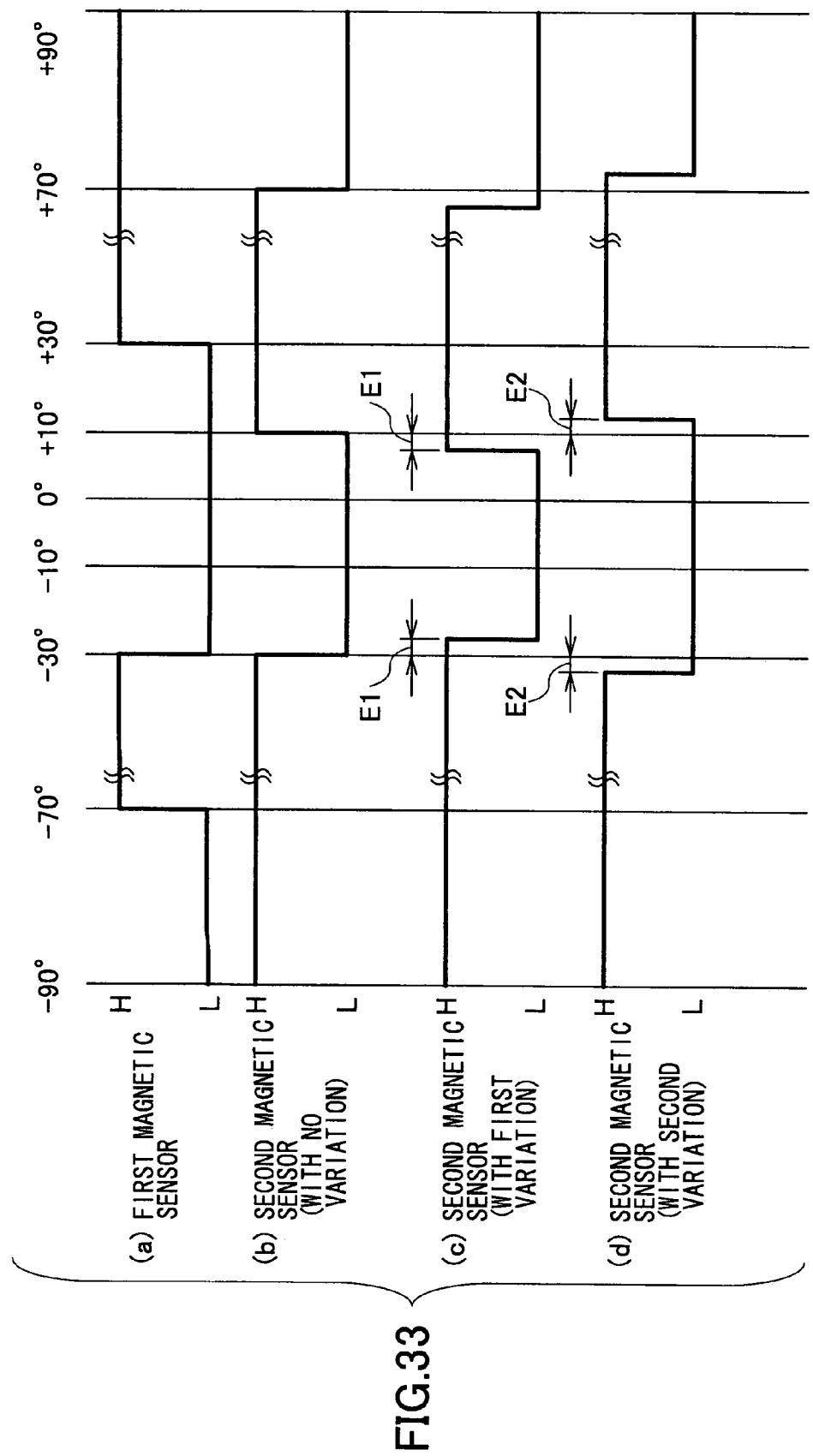
FIG. 33 is a diagram for illustrating the operation of the cellular phone according to the 11$^{th}$ embodiment of the present invention, in which (a) is a timing chart showing the output of the first magnetic sensor in the case where the movable part is rotated −90° to +90°, (b) is a timing chart showing the output of the second magnetic sensor (with no variation) in the case where the movable part is rotated −90° to +90°, (c) is a timing chart showing the output of the second magnetic sensor (with the first variation) in the case where the movable part is rotated −90° to +90°, and (d) is a timing chart showing the output of the second magnetic sensor (with the second variation) in the case where the movable part is rotated −90° to +90°.

Referring to FIG. 33, (a) and (b) show the relationship between the outputs of the first and second magnetic sensors 15 and 16 and Detection States A through C of the movable part 13 in this embodiment. As shown in (a) and (b) of FIG. 33, in the cellular phone of this embodiment also, it is possible to detect the three states of Detection States A through C of the movable part 13 with the two magnetic sensors 15 and 16 and the two magnets 17 and 18. Accordingly, the number of magnetic sensors can be reduced compared with the conventional portable terminal device the same as in the above-described embodiments. Therefore, it is possible to reduce the number of components and the number of interconnects, to lower the cost, and to facilitate wiring in the hinge part 21 compared with the conventional portable terminal device.

Referring to FIG. 33, (c) shows the case where there is the first variation in the second magnetic sensor 16 in this embodiment. When there is the first variation, the output of the second magnetic sensor 16 is reversed for the first time earlier than the appropriate state (shown in (b) of FIG. 33) by the angle indicated by arrow E1. Further, (d) of FIG. 33 shows the case where there is the second variation in the second magnetic sensor 16. When there is the second variation, the output of the second magnetic sensor 16 is reversed for the first time later than the appropriate state (shown in (b) of FIG. 33) by the angle indicated by arrow E2.

Thus, in this embodiment also, the first and second magnetic sensors 15 and 16 are provided in the movable part 13 so as to be offset from the first and second magnets 17 and 18, respectively. On the other hand, because of, for example, the detection errors of the magnetic sensors 15 and 16 and the attachment errors of the magnetic sensors 15 and 16 and the magnets 17 and 18, the timing of the first reversal of the output of the second magnetic sensor 16 in response to the plus or minus directional rotation of the movable part 13 may be shifted by the amount E1 or E2 compared with the appropriate state. The offsets of the magnetic sensors 15 and 16 are determined so as to be greater than the angles corresponding to the states E1 and E2.

Accordingly, in this embodiment also, even if the shift E1 shown in (c) of FIG. 33 or the shift E2 shown in (d) of FIG. 33 is caused by the first or second variation, the presence of the state (shift) E1 or E2 caused by, for example, the detection errors of the magnetic sensors 15 and 16 and the attachment errors of the magnetic sensors 15 and 16 and the magnets 17 and 18 does not cause the position calculation unit 19 to wrongly detect the position of the movable part 13. Accordingly, it is possible to detect the position of the movable part 13 with high accuracy, so that it is possible to perform appropriate displaying on the liquid crystal display part 20 provided in the movable part 13 and thus to increase the reliability of the portable terminal device.

In the above-described eighth through 11$^{th}$ embodiments, the magnetic sensors 15 and 16 are provided in the movable part 13, while the magnets 17 and 18 or the magnet 23 is provided in the arm part 12 (fixed part 11). However, the same effects can also be produced by providing the magnets 17 and 18 or the magnet 23 in the movable part 13 and providing the sensors 15 and 16 in the arm part 12 (fixed part 11).

Further, in the above description of the tenth and 11$^{th}$ embodiments, the case where the first magnetic sensor 15 is normal while there is the first or second variation in the second magnetic sensor 16 is taken as an example. However, also in the case where there is the first or second variation in the first magnetic sensor, it is possible to avoid detection error due to the first or second variation by offsetting the first magnetic sensor 15 with respect to the magnets 17 and 18 by the above-described predetermined amount by the same method as used for the second magnetic sensor 16.

Thus, according to embodiments of the present invention, it is possible to detect at least three states of a movable part with two magnets and two one-output magnetic sensors, two magnets and a single two-output magnetic sensor, two reflectors and a single photoelectric sensor, or a single magnet and two magnetic sensors. Accordingly, compared with the conventional configuration where components such as a sensor are provided for each of the positions corresponding to the three states, it is possible to reduce the number of components and the number of interconnects.

The present invention is not limited to the specifically disclosed embodiments, and variations and modifications may be made without departing from the scope of the present invention.

The present application is based on Japanese Priority Patent Applications No. 2006-216031, filed on Aug. 8, 2006, and No. 2006-263121, filed on Sep. 27, 2006, the entire contents of which are hereby incorporated by reference.

What is claimed is:

1. A portable terminal device, comprising:
   a movable part having a display part;
   an arm part provided on a base part, the arm part being configured to support the movable part so that the movable part is rotatable without overlapping the base part in a rotation range of at least ±90° with reference to a rotation center position around a rotation center, the arm part being configured to be foldable relative to the base part through a hinge part; and
   a position detection part configured to detect a rotational position of the movable part relative to the arm part,
   wherein the position detection part includes a pair of magnets, a pair of one-output magnetic sensors configured to detect magnetic fields of the magnets, and a calculation part configured to determine the rotational position of the movable part based on outputs of the one-output magnetic sensors,
   the magnets are provided in a first one of the arm part and the movable part so as to be 90° apart from each other around the rotation center,
   the one-output magnetic sensors are provided in a second one of the arm part and the movable part so as to oppose the corresponding magnets when the movable part is positioned at the rotation center position, and
   a first one of the magnets and a first one of the one-output magnetic sensors are positioned on a longitudinal center line passing through the rotation center and extending parallel to a long axis of the portable terminal device, and a second one of the magnets and a second one of the one-output magnetic sensors are positioned on a line perpendicular to the longitudinal center line and passing through the rotation center with the movable part being positioned at the rotation center position.

2. The portable terminal device as claimed in claim 1, wherein the one-output magnetic sensors are magnetoresistive elements.

3. The portable terminal device as claimed in claim 1, wherein the display part is in a landscape display position in response to one of a +90° rotation and a −90° rotation of the movable part.

4. A position detection method used in a portable terminal device, the portable terminal device including a movable part having a display part; an arm part provided on a base part, the arm part being configured to support the movable part so that the movable part is rotatable in a rotation range of at least ±90° with reference to a rotation center position around a rotation center; and a position detection part configured to detect a rotational position of the movable part relative to the arm part, the position detection method comprising:

moving the arm part into an unfolded state relative to the base part through a hinge part;

rotating the movable part relative to the arm part without the movable part overlapping the base part; and detecting the rotational position of the movable part relative to the arm part in the unfolded state using paired magnets provided in a first one of the arm part and the movable part so as to be 90° apart from each other around the rotation center, and paired one-output magnetic sensors provided in a second one of the arm part and the movable part so as to be 90° apart from each other around the rotation center, a first one of the magnets and a first one of the one-output magnetic sensors being positioned on a longitudinal center line passing through the rotation center and extending parallel to a long axis of the portable terminal device, and a second one of the magnets and a second one of the one-output magnetic sensors being positioned on a line perpendicular to the longitudinal center line and passing through the rotation center with the movable part being positioned at the rotation center position, wherein said detecting determines that the rotational position of the movable part is one of +90° and −90° from the rotation center position in response to the one-output magnetic sensors outputting different signals during a rotation of the movable part relative to the arm part.

5. A portable terminal device, comprising:

a movable part having a display part;

an arm part provided on a base part, the arm part being configured to support the movable part so that the movable part is rotatable without overlapping the base part in a rotation range of at least ±90° with reference to a rotation center position around a rotation center, the arm part being configured to be foldable relative to the base part through a hinge part; and a position detection part configured to detect a rotational position of the movable part relative to the arm part, wherein the position detection part includes a magnet, a pair of magnetic sensors configured to detect a magnetic field of the magnet, and a calculation part configured to determine the rotational position of the movable part based on outputs of the magnetic sensors, the magnet is provided in a first one of the movable part and the arm part, and the magnetic sensors are provided in a second one of the movable part and the arm part so as to be positioned at corresponding boundaries of a region within which the magnetic sensors sense the magnetic field of the magnet with the movable part being at the rotation center position, so that the magnetic sensors simultaneously sense the magnetic field of the magnet with the movable part being at the rotation center position.

6. The portable terminal device as claimed in claim 5, wherein:

the magnet is provided in the first one of the movable part and the arm part so as to be positioned on a center line passing through the rotation center to extend in a longitudinal direction of the first one of the movable part and the arm part.

7. A portable terminal device, comprising:

a movable part having a display part;

an arm part provided on a base part, the arm part being configured to support the movable part so that the movable part is rotatable without overlapping the base part in a rotation range of at least ±90° with reference to a rotation center position around a rotation center, the arm part being configured to be foldable relative to the base part through a hinge part; and a position detection part configured to detect a rotational position of the movable part relative to the arm part, wherein the position detection part includes a pair of first and second magnets, a pair of first and second magnetic sensors configured to detect magnetic fields of the first and second magnets, and a calculation part configured to determine the rotational position of the movable part based on outputs of the first and second magnetic sensors, and the first and second magnets are provided in a first one of the movable part and the arm part so as to be apart from each other by a first predetermined degree with reference to the rotation center position around the rotation center, and the first and second magnetic sensors are provided in a second one of the movable part and the arm part so as to be offset from first and second positions opposing the first and second magnets, respectively, to be apart from each other by a second predetermined degree with the movable part being at the rotation center position, one of the first predetermined degree and the second predetermined degree being 90°, so that the first and second magnetic sensors switch respective output signals at different timings.

8. The portable terminal device as claimed in claim 7, wherein the offset between one of the first and second magnets and a corresponding one of the first and second magnetic sensors is determined based on a variation in a range over which the magnetic field of the one of the first and second magnets extends and a variation in a detection range of the corresponding one of the first and second magnetic sensors.

\* \* \* \* \*